US011835390B2

(12) United States Patent
Torres-Rua

(10) Patent No.: US 11,835,390 B2
(45) Date of Patent: Dec. 5, 2023

(54) SPATIALLY ESTIMATING THERMAL EMISSIVITY

(71) Applicant: Alfonso Torres-Rua, North Logan, UT (US)

(72) Inventor: Alfonso Torres-Rua, North Logan, UT (US)

(73) Assignee: Utah State University, Logan, UT (US)

( * ) Notice: Subject to any disclaimer, the term of this patent is extended or adjusted under 35 U.S.C. 154(b) by 202 days.

(21) Appl. No.: 17/230,498

(22) Filed: Apr. 14, 2021

(65) Prior Publication Data

US 2021/0318172 A1 Oct. 14, 2021

Related U.S. Application Data

(60) Provisional application No. 63/009,588, filed on Apr. 14, 2020.

(51) Int. Cl.
*G01J 5/00* (2022.01)
*G06T 5/00* (2006.01)
(Continued)

(52) U.S. Cl.
CPC ............ *G01J 5/007* (2013.01); *B64C 39/024* (2013.01); *G06T 5/005* (2013.01); *G06T 7/40* (2013.01);
(Continued)

(58) Field of Classification Search
CPC ...... G06V 20/13; G06V 20/17; G06V 20/188; G06V 20/194; B64U 2101/00;
(Continued)

(56) References Cited

U.S. PATENT DOCUMENTS 5,021,980 A 6/1991 Poenisch
5,868,496 A 2/1999 Spitzberg
(Continued)

FOREIGN PATENT DOCUMENTS

CN 103196564 B 4/2015
CN 105930664 A 9/2016
(Continued)

OTHER PUBLICATIONS

Gao et al., Emissivity correction using spectrum correlation of infrared and visible images, Dec. 14, 2017, Elsevier B.V., Sensor and Actuators A 270 (2018) 8-17, pp. 1-10 (Year: 2017).*
(Continued)

*Primary Examiner* — Ian L Lemieux
*Assistant Examiner* — Woo C Rhim
(74) *Attorney, Agent, or Firm* — Thorpe North & Western, LLP.

(57) ABSTRACT

A technology is described for spatially estimating thermal emissivity. A method can include obtaining spectral emissivity data and satellite imaging data for a geographic area. A weighted emissivity model of emissivity values may be generated for surfaces included in the geographic area from the spectral emissivity data and the satellite imaging data, wherein the spectral emissivity data is mapped to the satellite imaging data to generate the weighted emissivity model. Thermal imaging data for the geographic area may be received from an airborne thermal imaging sensor and a thermal emissivity map can be generated for the geographic area using the thermal imaging data and the weighted emissivity model. The emissivity values from the weighted emissivity model can be used to estimate thermal emissivity values.

19 Claims, 21 Drawing Sheets

(51) Int. Cl.
  *G06T 7/40* (2017.01)
  *B64C 39/02* (2023.01)
  *H04N 23/11* (2023.01)
  *G06V 20/10* (2022.01)
  *G01J 5/80* (2022.01)
  *B64U 101/30* (2023.01)

(52) U.S. Cl.
  CPC ........... *G06V 20/188* (2022.01); *H04N 23/11* (2023.01); *B64U 2101/30* (2023.01); *G01J 5/802* (2022.01); *G01J 2005/0077* (2013.01); *G06T 2207/10036* (2013.01); *G06T 2207/10048* (2013.01)

(58) Field of Classification Search
  CPC ...... B64U 2101/30; G06T 2207/10032; G06T 2207/10036; G06T 2207/10048; G06T 2207/20; G06T 2207/20212; G06T 5/50; G01J 5/007; G01J 5/60; G01J 5/802; G01J 2005/0074; G01J 2005/0077; G01J 3/28; G01J 3/2823; H04N 23/10; H04N 23/11; H04N 23/23; G01N 21/25
  See application file for complete search history.

(56) References Cited

U.S. PATENT DOCUMENTS

| | | | | |
|---|---|---|---|---|
| 7,135,682 | B1* | 11/2006 | Lucey | G01J 3/2823 250/339.02 |
| 8,073,279 | B2* | 12/2011 | Riley | G06V 10/60 382/254 |
| 10,054,495 | B2 | 8/2018 | Jarboe | |
| 10,252,474 | B2 | 4/2019 | Donovan | |
| 11,029,211 | B2* | 6/2021 | Frank | G01J 5/00 |
| 2006/0018566 | A1* | 1/2006 | Coleman | G06T 3/4061 382/312 |
| 2010/0292951 | A1 | 11/2010 | Gaertner | |
| 2016/0179994 | A1* | 6/2016 | Levine | G06F 30/20 703/2 |
| 2017/0264833 | A1* | 9/2017 | Barnes | H04N 7/181 |
| 2018/0266886 | A1* | 9/2018 | Frank | B64C 39/024 |
| 2018/0266887 | A1* | 9/2018 | Frank | H02S 50/15 |
| 2018/0267008 | A1* | 9/2018 | Sutton | G06T 7/70 |
| 2018/0283953 | A1* | 10/2018 | Frank | G03B 15/006 |
| 2019/0220964 | A1* | 7/2019 | Mello | A01B 79/005 |
| 2019/0228225 | A1* | 7/2019 | Guo | A01B 79/005 |
| 2020/0184214 | A1* | 6/2020 | Casas | A01B 79/005 |
| 2020/0253127 | A1* | 8/2020 | McCall | G06V 10/764 |
| 2021/0118097 | A1* | 4/2021 | Guan | G06T 5/001 |
| 2021/0209803 | A1* | 7/2021 | Jha | G06F 16/54 |
| 2021/0239606 | A1* | 8/2021 | Gabrieli | G06V 20/13 |
| 2021/0319590 | A1* | 10/2021 | Gulde | G06T 3/4053 |
| 2022/0038644 | A1* | 2/2022 | McAllister | G06T 7/97 |
| 2022/0307971 | A1* | 9/2022 | Coen | G01N 21/274 |

FOREIGN PATENT DOCUMENTS

| | | | | |
|---|---|---|---|---|
| CN | 105204024 | A | | 2/2018 |
| CN | 108230281 | A | * | 6/2018 ............... G06T 5/50 |
| CN | 109101955 | A | * | 12/2018 |
| CN | 110569797 | A | * | 12/2019 |
| CN | 110319938 | B | * | 10/2020 |

OTHER PUBLICATIONS

Van De Griend et al.; "On the relationship between thermal emissivity and the normalized difference vegetation index for natural surfaces." Int. J. Remote Sensing; 1993, vol. 14, No. 6; pp. 1119-1131.

Kustas et al.; "The Grape Remote Sensing Atmospheric Profile and Evapotranspiration Experiment." American Meteorological Society; BAMS; Sep. 2018; pp. 1971-1812.

Torres-Rua et al., The Grape Remote Sensing Atmospheric Profile and Evapotranspiration Experiment, BAMS, Sep. 2018, pp. 1791-1812, vol. 99, No. 9, American Meteorological Society, Massachusetts.

Torres-Rua et al., Estimation of surface thermal emissivity in a vineyard for UAV microbolometer thermal cameras using NASA HyTES hyperspectral thermal, Landsat and AggieAir optical data, Proc. SPIE Int. Soc. Opt. Eng., May 14, 2019.

Van De Griend, On the relationship between thermal emissivity and the normalized difference vegetation index for natural surfaces, Journal of Remote Sensing, 1993, pp. 119-1131, vol. 14, Issue 6, Taylor & Francis, United Kingdom.

Heinemann et al., Land Surface Temperature Retrieval for Agricultural Areas Using a Novel UAV Platform Equipped with a Thermal Infrared and Multispectral Sensor, Remote Sensing, Mar. 27, 2020, vol. 12, Issue 7.

* cited by examiner

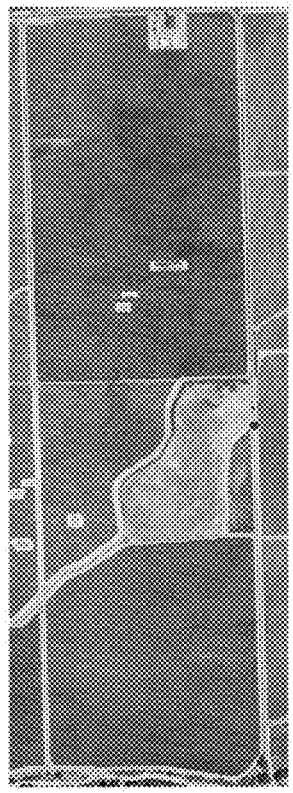
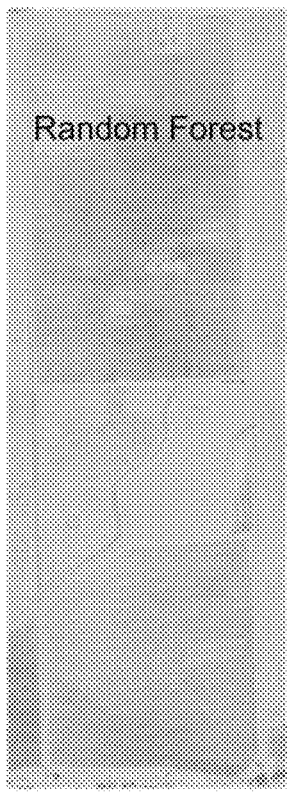
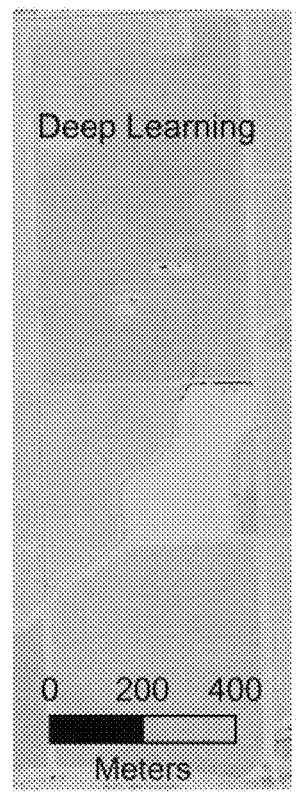
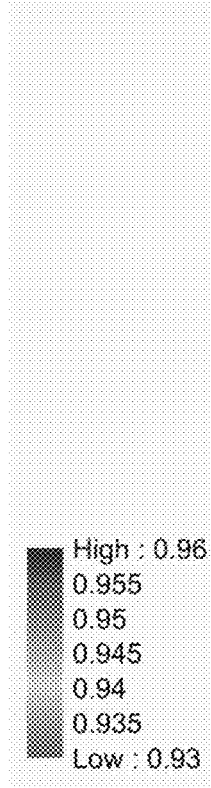
FIG. 14A          FIG. 14B          FIG. 14C
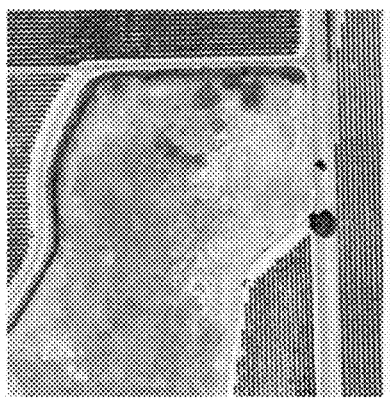
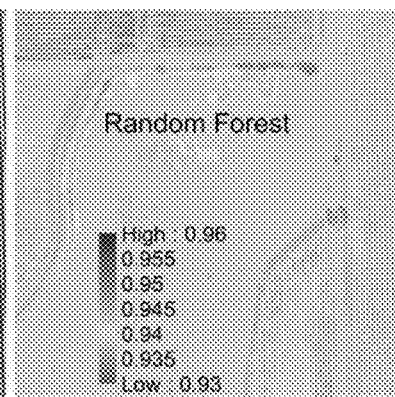
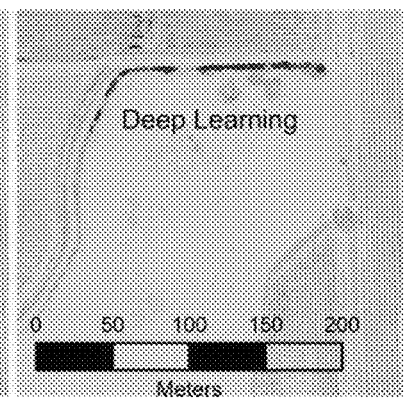
FIG. 14D          FIG. 14E          FIG. 14F

SPATIALLY ESTIMATING THERMAL EMISSIVITY

RELATED APPLICATION

This application claims priority to U.S. Provisional Application No. 63/009,588, filed Apr. 14, 2020, which is incorporated herein by reference.

BACKGROUND

A major goal of thermal remote sensing is the estimation of the true (kinetic) surface temperature due to its usefulness in diverse applications such as urban monitoring, energy balance, vegetation conditions, and climate change among others. The importance of thermal remote sensing in agriculture has been demonstrated at scales from global to regional and from farm to sub-plant, the latter scale being addressed by infrared temperature sensors and microbolometer cameras. Infrared sensors and microbolometer cameras differ from the technologies used in satellite missions. The main difference is the lack of "cooling" mechanisms to maintain the sensor at a constant operating temperature. Microbolometer cameras include additional procedures to stabilize the operation conditions before and during use, thus avoiding "drift" conditions that are difficult to correct/adjust after data collection. Furthermore, infrared sensors and microbolometer cameras have, by design, different spectral characteristics, making them distinct from the spectral characteristics from scientific satellite missions.

SUMMARY

A technology is described for spatially estimating thermal emissivity by generating a model of emissivity values for surfaces from existing spectral emissivity and satellite optical imaging information and using the emissivity model with airborne imaging information to estimate emissivity values to be used to estimate accurate kinematic thermal imaging data. In one example of the technology, a thermal emissivity map for a geographic area can be generated using thermal imaging data and a weighted emissivity model. For example, spectral emissivity data for the geographic area, which may be obtained using an airborne thermal imaging spectrometer, and satellite imaging data for the geographic area can be used to generate a weighted emissivity model. The weighted emissivity model can include emissivity values for surfaces included in the geographic area. The weighted emissivity model can be generated from the spectral emissivity data and the satellite imaging data by mapping the spectral emissivity data to the satellite imaging data.

The a thermal emissivity map can then be generated using thermal imaging data for the geographic area, which can be obtained using an airborne thermal imaging sensor, and the weighted emissivity model. For example, the emissivity values in the weighted emissivity model can be used to estimate emissivity values in the thermal imaging data, and the estimated emissivity values can be used to create a more accurate kinematic thermal map.

The technology can be particularly beneficial for thermal mapping of agricultural and natural growth locations (e.g. farms, sensitive habitats, streams, adjacent environments, etc.). However, the technology can be used to accurately map other environments such as, but not limited to, industrial settings (e.g. inspections, leak detections, etc.), urban construction such as sidewalks, roads, roofs, etc., geological surveys, woven materials, and geological and rock features.

There has thus been outlined, rather broadly, the more important features of the technology so that the detailed description thereof that follows may be better understood, and so that the present contribution to the art may be better appreciated. Other features of the present technology will become clearer from the following detailed description of the technology, taken with the accompanying drawings and claims, or may be learned by the practice of the technology.

BRIEF DESCRIPTION OF THE DRAWINGS

FIG. 14A is an aerial UAV RUB image of a region.

FIG. 14B is an image of the same region as FIG. HA showing narrowband emissivity results from a random forest model.

FIG. 14C is an image of the same region as FIG. 14A showing narrowband emissivity results from a deep-learning model.

FIG. 141) is a magnified region of the image in FIG. 14A.

FIG. 14E is a magnified region of the image of FIG. 14B,
FIG. 14F is a magnified region of the image of FIG. 14C.

Figure 1A:
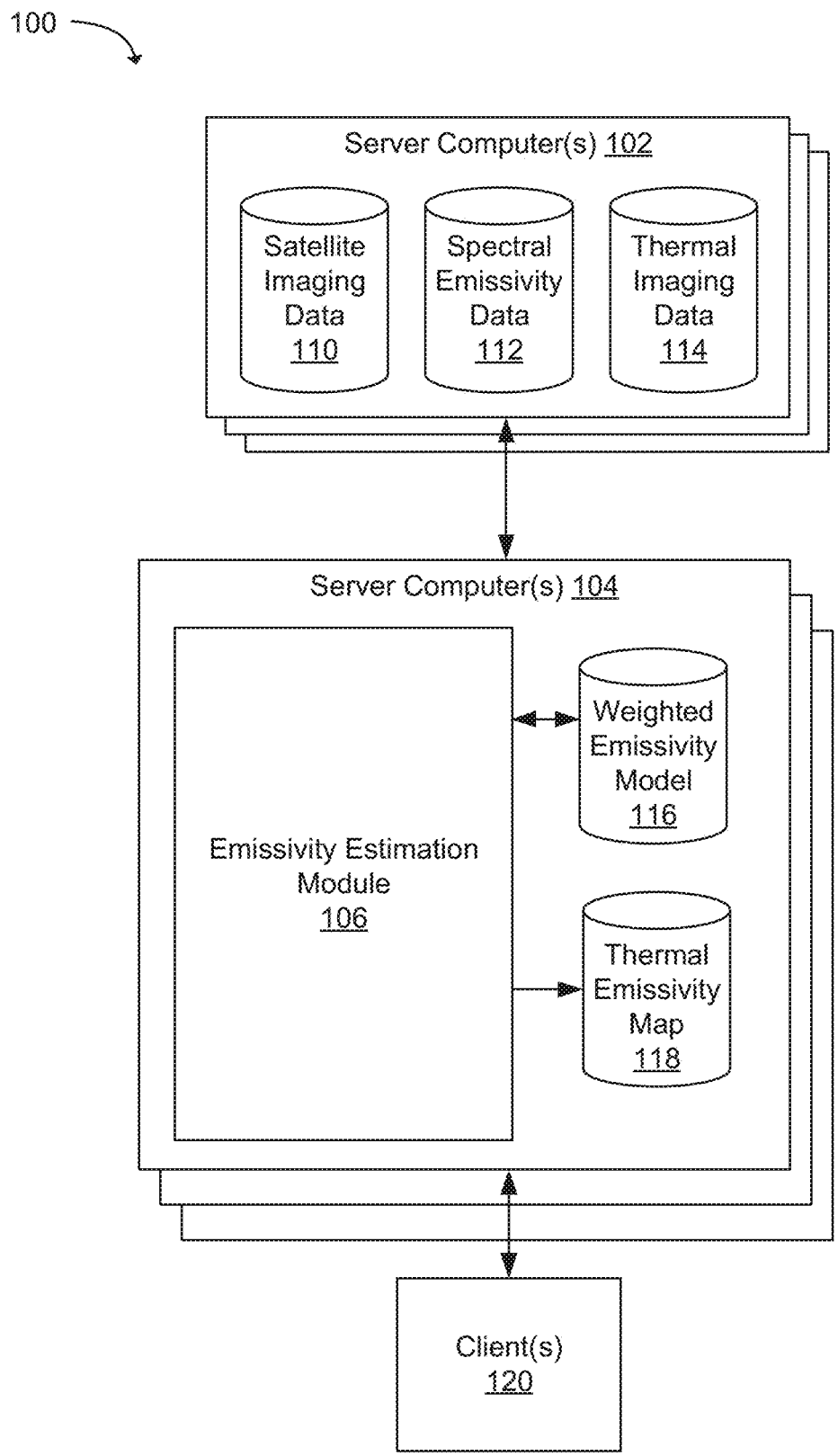
FIG. 1A is a block diagram illustrating components of an example system environment on which the present technology can be executed.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the technology, it should be understood that other embodiments may be realized and that various changes to the technology may be made without departing from the spirit and scope of the present technology. Thus, the following more detailed description of the embodiments of the present technology is not intended to limit the scope of the technology, as claimed, but is presented for purposes of illustration only and not limitation to describe the features and characteristics of the present technology, to set forth the best mode of operation of the technology, and to sufficiently enable one skilled in the art to practice the technology. Accordingly, the scope of the present technology is to be defined solely by the appended claims.

Definitions

In describing and claiming the present technology, the following terminology will be used.

The singular forms "a," "an," and "the" include plural referents unless the context clearly dictates otherwise. Thus, for example, reference to "a channel" includes reference to one or more of such channels and reference to "the sensor" refers to one or more of such devices.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the technology should be determined solely by the appended claims and their legal equivalents, rather than by the descriptions and examples given herein.

Example Embodiments

A technology is described for spatially estimating thermal emissivity by generating an emissivity model of emissivity values for surfaces from spectral emissivity data and satellite imaging data and using the emissivity values in the emissivity model to estimate kinematic thermal imaging data. Thermal information provides valuable information on historical and current human and environmental activities such as vegetation and soil conditions, energy balance modeling, environmental stressor effects, and climate change. In agriculture, thermal information has demonstrated its importance at global, regional, farm and sub-plant scales from an array of technologies that includes thermocouples, infrared radiometers, and microbolometer cameras. Infrared sensors and microbolometer cameras are technologies that can provide continuous soil, plant, and sub-plant thermal information, with applications in consumptive water use, nitrogen content, fruit/root development, crop water stress, soil moisture, and other parameters.

Accurate thermal imaging can be very useful in many different applications. For example, temperature measurements of crops can identify plants that may be at risk of being harmed by compaction, disease, insects, or other stressors. Additionally, soil temperature data can determine drainage and refine recommendations for optimal soil zones. Unmanned aerial vehicles (UAVs) and manned aircraft can be equipped with microbolometer thermal cameras in order to acquire high-resolution temperature data.

Thermal information from infrared technologies may be affected by four major factors: radiometric calibration, atmospheric conditions (water vapor, air temperature), spectral characteristics of the instrument, and surface emissivity. These four factors may be addressed to adequately characterize the temperature conditions of the surface. For example, radiometric calibration can be addressed by using and verifying radiometric measurements obtained from an infrared sensor against a blackbody instrument. Atmospheric conditions can be addressed through a collection of ground temperature measurements or by using models that describe the effects of water vapor and $CO_2$ that vary with the spectral response. The other two factors are interrelated. The thermal emissivity of a surface may be related to the nature of the material and either the difference in radiation between a blackbody object and the object under study at the same temperature and infrared sensor spectral response (narrowband) or across the wavelength range of thermal response of Earth materials (3 to +15 μm).

In the past, tools including tables and general criteria were developed to simplify assignment of emissivity values to Earth and man-made surfaces. These tool were developed for existing thermal technology at the time, which included mostly satellite thermal sensors. The thermal technology was uniquely developed to address the four factors mentioned above, with emphasis on the selection of spectral regions that minimize atmospheric correction and allow for overall emissivity values for surface types (soil, vegetation, water). However, these tools may not be optimal for more recent portable or miniaturized thermal sensors, which may present significantly different emissivity values due to the broad spectral response (7 to 14 μm). For example, although efforts have been made to provide spatial emissivity estimates from satellite data (e.g., from NASA's ASTER Global Emissivity Dataset and ECOSTRESS programs), these estimates are being used to derive surface temperature from Landsat and ECOsystem Spaceborne Thermal Radiometer Experiment on Space Station (ECOSTRESS). Little to no effort has been made to provide spatial emissivity estimates from satellite data for miniaturized microbolometer sensor databases. Currently, hyperspectral laboratory measurements such as the MODIS UC Santa Barbara Emissivity database, and measurements from NASA JPL Hyperspectral Thermal Emission Spectrometer (HyTES) are available for use with miniaturized microbolometer sensor databases. However, these datasets are not well known or used by the UAV scientific community.

A microbolometer is a detector used to detect electromagnetic radiation in a thermal camera. A thermal camera is a device that forms a heat zone image using infrared radiation. The thermal emissivity of a surface is needed to convert a camera temperature into a true surface temperature. Thermal emissivity is the ratio of energy radiated from a material's surface to that radiation from a perfect emitter (i.e. a blackbody) under the same conditions. Emissivity is different for each surface, such as water, vegetation, soil, and manmade. Prior to the present technology, there was no way to calculate thermal emissivity for portable thermal sensors, such as microbolometer sensors.

Microbolometer thermal cameras in UAVs and manned aircraft allow for the acquisition of high-resolution temperature data, which, along with optical reflectance, contributes to monitoring and modeling of agricultural and natural environments. Furthermore, these temperature measurements have facilitated the development of advanced models of crop water stress and evapotranspiration in precision agriculture and heat fluxes exchanges in small river streams and corridors. Microbolometer cameras capture thermal information at blackbody or radiometric settings (narrowband emissivity equates to unity). While it is customary that the modeler uses assumed emissivity values (e.g., 0.99-0.96 for agricultural and environmental settings); some applications (e.g., Vegetation Health Index), and complex models such as energy balance-based models (e.g., evapotranspiration) could benefit from more accurate spatial estimates of surface emissivity for true or kinetic temperature mapping.

To further describe the present technology, examples are now provided with reference to the figures, FIG. 1A is a block diagram illustrating components of an example system environment 100 on which the present technology may be executed. In one example, the system environment 100 can comprise a data center, service provider environment (e.g., cloud environment), one or more personal computers, and other computing systems. In another example, the system environment 100, or selected components of the system environment 100, can be coupled to an aerial vehicle (e.g., UAV or manned aircraft).

The system environment 100 may include server computers 102, 104 that host various computing modules and data stores. The server computer 102 may host data stores (e.g., databases) for satellite imaging data 110, spectral emissivity data 112, thermal imaging data 114, and other data. In one example, satellite imaging data 110 can be obtained from a publicly available government or commercial satellite image provider. The satellite imaging data 110 can include an image and metadata (e.g., location coordinates, image resolution, timestamp, etc.) for a geographic area. The satellite imaging data 110 can be stored to a data store on the server computer 102. For example, the satellite imaging data 110 can be obtained from NASA's Landsat satellite images. In another example, satellite imaging data 110 can be obtained from an external data store (e.g., a government or commercial data store) via a network (e.g., the Internet) at the time that the satellite imaging data 110 is needed to generate a thermal emissivity map 118.

Spectral emissivity data 112 can be generated for a geographic area using an airborne imaging spectrometer, and the spectral emissivity data 112 may be stored to a data store hosted on the server computer 102. Emissivity is the measure of an object's ability to emit infrared energy. Emitted energy indicates the temperature of the object. Emissivity can have a value from 0 (e.g., a mirror) to 1.0 (e.g., a blackbody). Most organic, painted, or oxidized surfaces have emissivity values close to 0.95. Spectral emissivity data 112 can include an emissivity value and metadata (e.g., location coordinates, image resolution, timestamp, etc.) for an object. In one example, a UAV configured with an imaging spectrometer (e.g., a hyperspectral thermal emission spectrometer (HYTES)) can be used to capture spectral emissivity data 112 for objects in a geographical area (e.g., a farm, wetland habitat, stream, etc.), and the spectral emissivity data 112 can be stored to a data store on the server computer 102. In one example, the spectral emissivity data 112 can be obtained from the NASA JPL HYTES airborne program. The spectral emissivity data 112 can include spectral-spatial information which can be used to map the spectral emissivity data 112 to a spatial scale of satellite imaging data 110 that corresponds to a geographic area of the spectral emissivity data 112.

The thermal imaging data 114 may be generated for a geographic area by an airborne thermal imaging sensor (e.g., a microbolometer), and the thermal imaging data 114 may be stored to a data store hosted on the server computer 102. Thermal imaging data 114 can include a thermal value and metadata (e.g., location coordinates, image resolution, timestamp, etc.) for a geographic area. In one example, a UAV configured with a microbolometer can be used to capture thermal imaging data 114 for a geographical area, and the thermal imaging data 114 can be stored to a data store on the server computer 102. As will be appreciated, the spectral emissivity data 112 and the thermal imaging data 114 may be for a plurality of geographical areas, locations, and/or features.

Figure 1B:
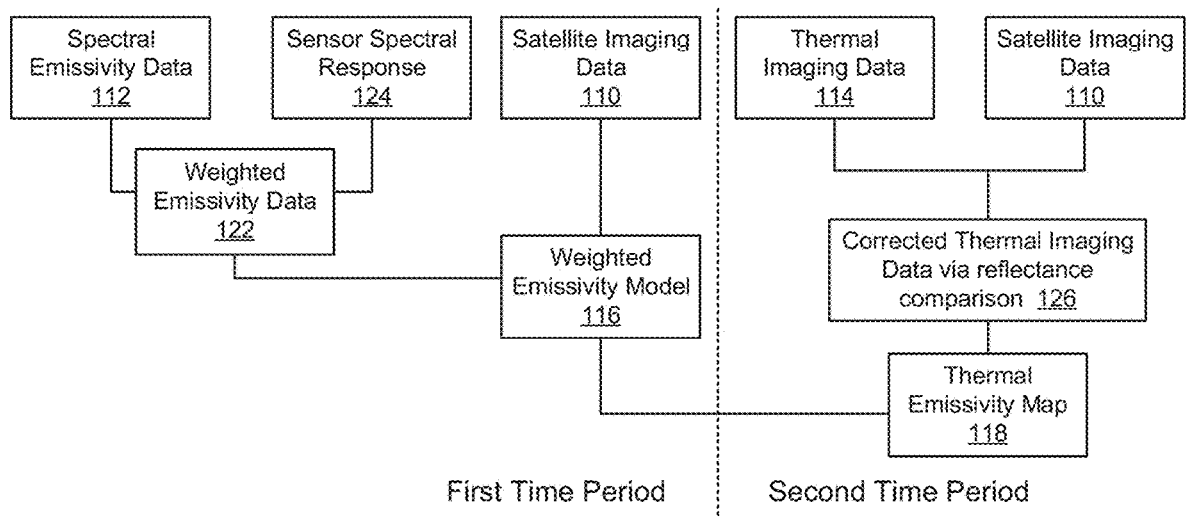
FIG. 1B is a flow diagram that illustrates a method for determining accurate kinematic temperature using a weighted emissivity model, in accordance with an example of the present disclosure.

The server computer 104 may host an emissivity estimation module 106, as well as data stores for storing data output from the emissivity estimation module 106. In one example, the emissivity estimation module 106 can be configured to generate a weighted emissivity model 116 containing weighted emissivity values for surfaces in a geographic area. The weighted emissivity model 116 can be generated from spectral emissivity data 112 and satellite imaging data 110. Referring generally to FIGS. 1A-B, the emissivity estimation module 106 may perform the steps shown in FIG. 1B. The first step can include generating weighted emissivity data 122, wherein weights which are based on a sensor spectral response 124 of a thermal imaging sensor (e.g., microbolometer) are assigned to spectral emissivity data 112 obtained from an imaging spectrometer (e.g., HYTES). For example, in order to minimize potential biases, the emissivity estimation module 106 may ensure that the emissivity values from an imaging spectrometer (e.g., HYTES) and a thermal imaging sensor (microbolometer) agree. Thus, in one example, the emissivity estimation module 106 may convert the spectral emissivity data 112 to weighted emissivity values that correspond to a spectral response of the thermal imaging sensor (microbolometer) used to generate the thermal imaging data 114. For example, the emissivity values of the spectral emissivity data 112 can be converted to weighted emissivity values that correspond to the spectral response of a microbolometer. In one example, the emissivity estimation module 106 can calculate a narrowband emissivity for selected or surface based on a spectral response of the thermal imaging sensor (e.g., a microbolometer). The narrowband emissivity can be given as $$\varepsilon = \int_{\lambda_1}^{\lambda_2} \varepsilon_\lambda \cdot f_\lambda d\lambda,$$

wherein $\varepsilon_\lambda$ is an emissivity value for a wavelength $\lambda$, and $f_\lambda$ is the spectral response of the thermal imaging sensor for a defined waveband, and an integral $f_\lambda$ is equal to unity, and $\lambda_1$ and $\lambda_2$ are limits of the spectral response of the sensor.

Thereafter, the emissivity estimation module 106 may perform a second step of linearly aggregating the weighted emissivity data 122 to a spatial scale of corresponding satellite imaging data 110 to form a weighted emissivity model 116. The spectral emissivity data 112 can include spectral-spatial information which can be used by the emissivity estimation module 106 to map the spectral emissivity data 112 to a spatial scale of the satellite imaging data 110. The time period of the spectral emissivity data 112 and the satellite imaging data 110 may be substantially the same (e.g., same day, week, or month), or close in time, (e.g., within a few days, weeks, or months). For example, to ensure that relevant data is being used, a time stamp for the spectral emissivity data 112 can be compared to a time stamp for the satellite imaging data 110.

The emissivity estimation module 106 can be configured to generate a thermal emissivity map 118 using the weighted emissivity model 116 generated by the emissivity estimation module 106 and thermal imaging data 114 that corresponds to the geographical area of the weighted emissivity model 116. The thermal imaging data 114 can be normalized to correspond to the satellite imaging data 110. The emissivity estimation module 106 can perform a step (shown in FIG. 1B) that compares reflectance of the thermal imaging data 114 and the satellite imaging data 110 and corrects the thermal imaging data 126 based on the comparison. For example, the emissivity estimation module 106 can map surface reflectance information in the thermal imaging data 114 to reflectance information included in the satellite imaging data 110 and correct surface reflectance information in the thermal imaging data 114 that does not map to the satellite imaging data 110.

Thereafter, the emissivity estimation module 106 may perform a second step (shown in FIG. 1B) to generate a thermal emissivity map 118 using the corrected thermal imaging data 126 and the weighted emissivity model 116, wherein emissivity values from the weighted emissivity model 116 are used to estimate emissivity values (e.g., at UAV resolution (0.15M)) in the thermal imaging data 114 to produce the thermal emissivity map 118. The values of thermal emissivity map 118 can be provided as an accurate kinematic thermal map. In one example, the emissivity estimation module 106 may use machine learning to estimate narrowband emissivity values. For example, a deep-learning model comprising an input layer, hidden layers, and an output layer can be used. The input layer can include the satellite image bands, band ratios, and index values (e.g., four bands, six band ratios, and six normalized difference indexes). The output layer can include emissivity values. The hidden layers can include a number of nodes that transform the input data and enable statistical interactions using activation functions e.g., Rectified Linear Unit function) between the inputs and outputs. A regularization method based on Lasso Regression can be applied to avoid overfitting. The number of hidden layers, number of nodes per layer, number of epochs, and batch size can be selected to find the appropriate deep-learning model. The batch size can be the number of training samples processed before the deep-learning parameters are updated. The emissivity result with the best goodness of fit statistics can be incorporated into the radiometric temperature.

In one example, the emissivity estimation module 106 can be configured to perform broadband emissivity analysis. For example, broadband emissivity analysis can be performed based on a hyperspectral emissivity dataset (e.g., a MOMS UCSB Emissivity Library database from 3 to 14 µm) to approximate the broadband emissivity estimates at a UAV pixel scale, using a narrowband emissivity estimation from the thermal emissivity map 118. The broadband emissivity can be used to estimate outgoing longwave radiation, as part of net radiation, once the surface (kinematic) temperature is available in the thermal emissivity map 118. Given the closeness of the spectral range of the narrowband to the broadband emissivities, the narrowband to broadband model can be developed by first estimating the narrowband emissivity by a ratio of a convolved sum-product hyperspectral emissivity, microbolometer spectral response, and the Planck equation at a temperature of 300K, and the convolved sum-product of the microbolometer spectral response and the Planck equation. The broadband emissivity can be calculated as the sum-product of hyperspectral emissivity and the Planck equation divided by the sum of the Planck equation for the 3 to 14 µm.

A thermal emissivity map 118 generated by the emissivity estimation module 106 can be provided to various clients 120, such as client services and client devices, to allow the clients 120 to utilize the estimated emissivity values in the thermal emissivity map 118 (e.g., generate data visualizations, such as heat maps, graphs, tables, etc.). A client device 120 may include any device capable of sending and receiving data over a network 120. A client service may include a computing service configured to obtain a resource (e.g., a thermal emissivity map 118) from another service (e.g., the emissivity estimation module 106 or service), and utilize the resource as part of performing a service or function. A client device 120 may comprise, for example a processor-based system such as a computing device. A client device may be a device such as, but not limited to, a desktop computer, laptop or notebook computer, tablet computer, mainframe computer system, handheld computer, workstation, network computer, or other devices with like capability.

As described earlier, in one example, the system environment 100, or components of the system environment 100 can be coupled to an aerial vehicle. In such a configuration, a thermal emissivity map 118 can be generated onboard the aerial vehicle and the thermal emissivity map 118 can be transmitted to a computing node (e.g., in a data center, etc.) to allow an accurate kinematic thermal map to be produced from the thermal emissivity map 118, which may be accessible via a client 120 (e.g., computer, mobile device, etc.). For example, the thermal emissivity map 118 can be transmitted over a cellular network, satellite network, or another appropriate network. In one example, the thermal emissivity map 118 can be stored to a memory device located on the aerial vehicle to allow the thermal emissivity map 118 to be transferred from the memory device when a network connection is available.

The various processes and/or other functionality contained within the system environment 100 may be executed on one or more processors that are in communication with one or more memory modules. The system environment 100 may include a number of computing devices that are arranged, for example, in one or more server banks or computer banks or other arrangements. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area. Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 100 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A network may be provided to allow communication between the server computers 102, 104 and client devices 120. The network can include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 1A-B illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for a desired or each module to enable a second module to send requests to and receive output from the first module. Such APIs may also allow third parties to interface with the module and make requests and receive output from the modules. While FIG. 1A-B illustrates an example of a system that may implement the techniques above, many other similar or different environments are possible. The example environments discussed and illustrated above are merely representative and not limiting.

Figure 2:
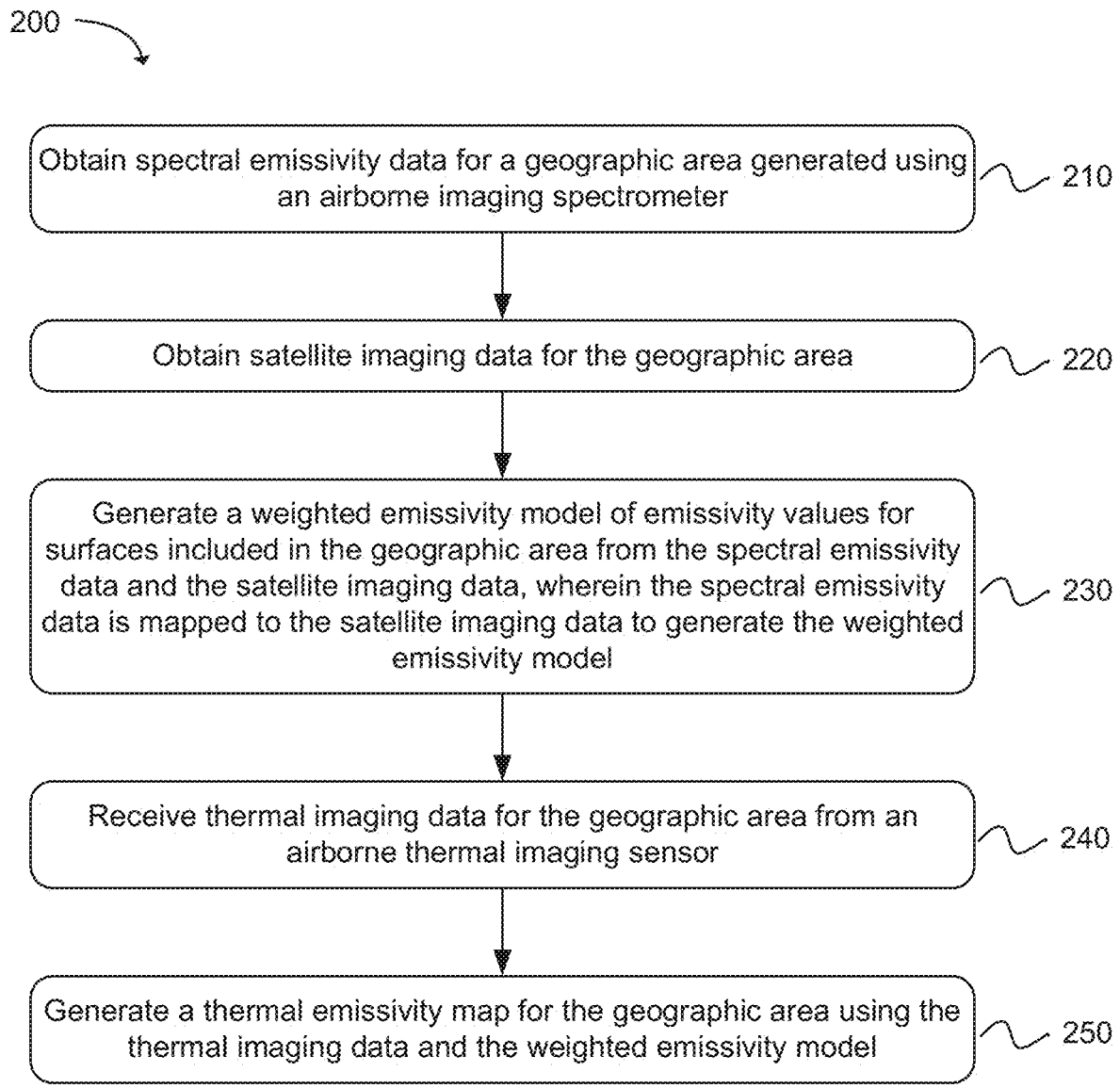
FIG. 2 is a flow diagram illustrating an example method for estimating thermal emissivity, in accordance with an example of the present disclosure.
Figure 4:
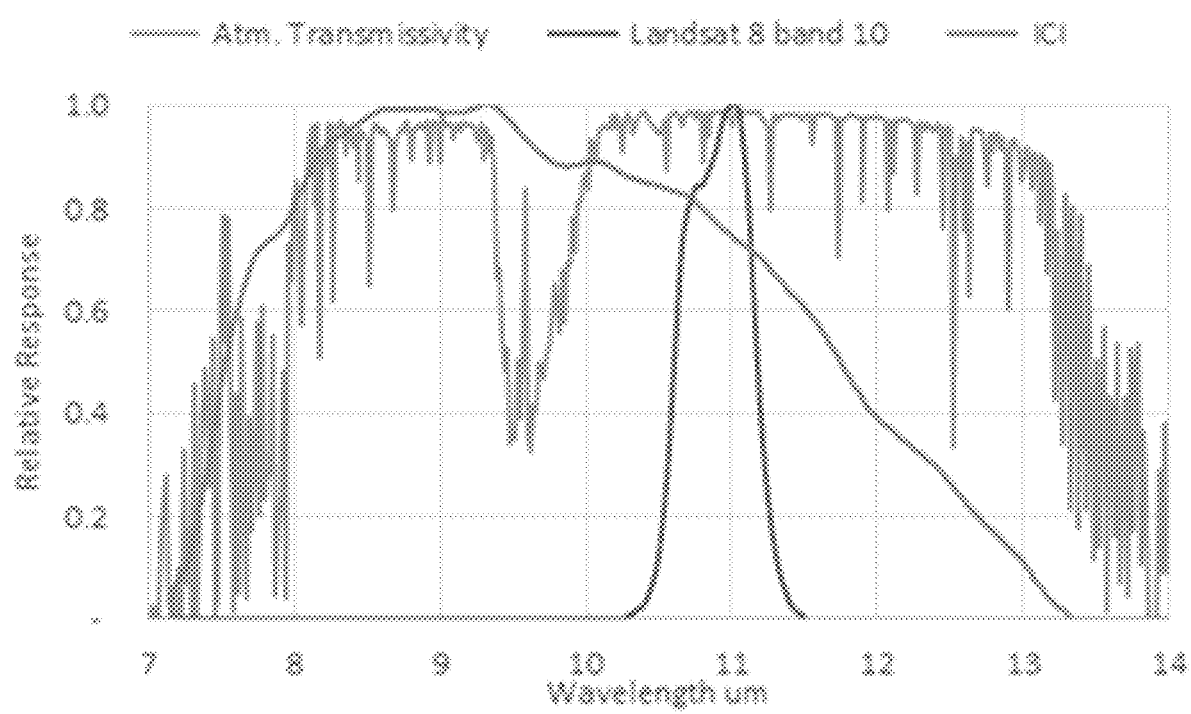
FIG. 4 is a graph showing the spectral response of average atmospheric transmissivity, satellite imaging, and thermal imaging using an airborne imaging spectrometer.

FIG. 2 is a flow diagram that illustrates an example method for spatially estimating thermal emissivity. The following discussion provides context to better understand the present technology presented in FIG. 2. Due to its spectral response (as illustrated in FIG. 4), a microbolometer camera will be affected by the reduction in atmospheric transmissivity at the beginning and end of the spectral thermal windows and, additionally, by the significant atmospheric absorption due to Ozone molecules ("dip" in atmospheric transmissivity between 9 and 10 um). Furthermore, Landsat and other scientific thermal satellites choose a narrow spectral width to avoid a reduction in thermal signal due to atmospheric transmissivity. Microbolometer sensors technology rely on the width of the thermal spectral window to capture an adequate number of photons for thermal measurements. Therefore, it is expected that the spectral response of microbolometer cameras will affect kinematic temperature estimation procedures and prompting for methodologies to make them equivalent to satellite thermal products.

Regarding kinematic and sensor (blackbody) temperature, the spectral response of the thermal sensor is allows the estimation of the true (or Kinematic) surface temperature. The relationship between radiometric and the kinematic temperature can be approximated as shown here:

$$T_{rad} = \varepsilon^{1/4} T_{kin} \quad (1)$$

where $T_{rad}$ is the radiometric temperature (Kelvin) measured by the temperature sensor (Landsat or microbolometer), $T_{kin}$ is the surface or kinematic temperature (Kelvin) and $\varepsilon$ is the thermal emissivity of the surface being measured. This emissivity is also called narrowband emissivity, due to its relationship to the spectral characteristics of the sensor measuring $T_{rad}$. This equation can be considered valid only for very small distances between the sensor and the surface (1 to ~3 m). A complete solution of the atmospheric transmissivity can be used for longer distances (which includes UAVs, aircraft, and satellites).

Thermal emissivity is a property of every surface and is influenced by the characteristics of the surface, such as spectral response, reflectance, roughness, thickness, water content, and energy amount (kinetic energy). Emissivity is typically reported in educational literature as an average value within the 8 to 14 µm range. For satellite temperature applications, a significant effort is made to estimate narrowband emissivity based on the spectral response of the sensor as presented here:

$$\varepsilon = \int_{\lambda_1}^{\lambda_2} \varepsilon_\lambda \cdot f_\lambda d\lambda \qquad (2)$$

where $\varepsilon_\lambda$ is the emissivity value for a wavelength $\lambda$, and $f_\lambda$ is the spectral response of the sensor for a specific waveband. The integral of $f_\lambda$ is equal to unity, and $\lambda_1$ and $\lambda_2$ are the limits of the spectral response of the sensor. Given the spectral differences between satellite and microbolometer thermal sensors, the objectives are twofold: (1) determine the impact of the spectral response of a microbolometer thermal sensor on the estimation of narrowband emissivities and surface temperature for agricultural and environmental environments, and (2) develop an initial model for spatially estimating narrowband emissivity that responds to the microbolometer sensor characteristics based on optical and infrared information from satellite imaging data and the microbolometer thermal sensor.

Similarly, for large distances, narrowband thermal emissivity can be estimated as follows:

$$L_S = \tau \varepsilon L_G + L_U + (1-\varepsilon) L_D \qquad (3)$$

where $\tau$ is the atmospheric transmissivity, $\varepsilon$ is the emissivity of the surface, $L_G$ is the blackbody radiance of the surface at ground level, $L_U$ is the up-welling or atmospheric path radiance, $L_D$ is the down-welling or sky radiance, and $L_S$ is the radiance measured by the temperature sensor on board a UAV, manned aircraft, or satellite.

The present technology creates a model of thermal emissivity using spectral spatial information from, for example, the NASA JPL Hyperspectral Thermal Emission Spectrometer (HYTES) airborne program and NASA's Landsat satellite images. The thermal emissivity model quantifies the relationship between emissivity (e.g., obtained from HYTES) and optical satellite data (e.g., Landsat) through machine learning methods. The thermal emissivity model can then be used to generate a thermal emissivity map for an area imaged by UAVs. An accurate thermal map of the imaged area can be derived from the thermal emissivity map by using the emissivity values to correct estimated temperature values. Hyperspectral imaging produces an image where each pixel has full spectral information with imaging narrow spectral bands over a contiguous spectral range.

Accordingly, referring again to FIG. 2, in block 210, spectral emissivity data generated using an airborne imaging spectrometer (e.g., a hyperspectral thermal emission spectrometer) can be obtained for a geographic area (e.g., farms, sensitive habitats, streams, adjacent environments, etc.). As in block 220, satellite imaging data for the geographic area can also be obtained. The satellite imaging data may be for the same time period (e.g., day, week, month, etc.), or substantially the same time period (within a few days or weeks) as that of the spectral emissivity data. As described earlier, the satellite imaging data can be obtained from NASA's Landsat program or a commercial satellite imaging provider.

As in block 230, the spectral emissivity data and the satellite imaging data can be used to generate a weighted emissivity model of emissivity values for surfaces included in the geographic area. The spectral emissivity data can be mapped to the satellite imaging data to generate the weighted emissivity model. In one example, the spectral emissivity data can be converted to weighted emissivity values that correspond to a spectral response of the thermal imaging sensor. The spectral emissivity data can include spectral-spatial information which can be used to map the spectral emissivity data to a spatial scale of the satellite imaging data. In one example, generating the weighted emissivity model may include calculating a narrowband emissivity for each of the surfaces based on a spectral response of the thermal imaging sensor, where the narrowband emissivity is given as $$\varepsilon = \int_{\lambda_1}^{\lambda_2} \varepsilon_\lambda \cdot f_\lambda d\lambda$$

wherein $\varepsilon_\lambda$ is an emissivity value for a wavelength $\lambda$, and $f_\lambda$ is the spectral response of the thermal imaging sensor for a defined waveband, and an integral of $f_\lambda$ is equal to unity, and $\lambda_1$ and $\lambda_2$ are limits of the spectral response of the sensor.

As in block 240, thermal imaging data for the geographic area can be received from an airborne thermal imaging sensor (e.g., a microbolometer sensor) which may be attached to a UAV or manned aircraft. The thermal imaging data may be for the same time period (e.g., day, week, month, etc.), or substantially the same time period (within a few days or weeks) as that of the spectral emissivity data and satellite data. In one example, surface reflectance information included in the thermal imaging data can be mapped to reflectance information included in satellite imaging data (e.g., Landsat data) for the same geographic area, and the surface reflectance information in the thermal imaging data can be compared to the surface reflectance information in the satellite imaging data. In the case that the surface reflectance information does not correspond (e.g., the surface reflectance information biases the satellite imaging data), the surface reflectance information can be corrected using the emissivity values from the weighted emissivity model.

As in block 250, a thermal emissivity map for the geographic area can be generated using the thermal imaging data and the weighted emissivity model. The emissivity values from the weighted emissivity model can be used to correct estimated emissivity values in the thermal imaging data when the emissivity values in the weighted emissivity model are more correct as compared to the estimated emissivity values derived from the thermal imaging data. This may allow a more accurate kinematic thermal map to be produced as compared to relying solely on the satellite imaging data.

Figure 3:
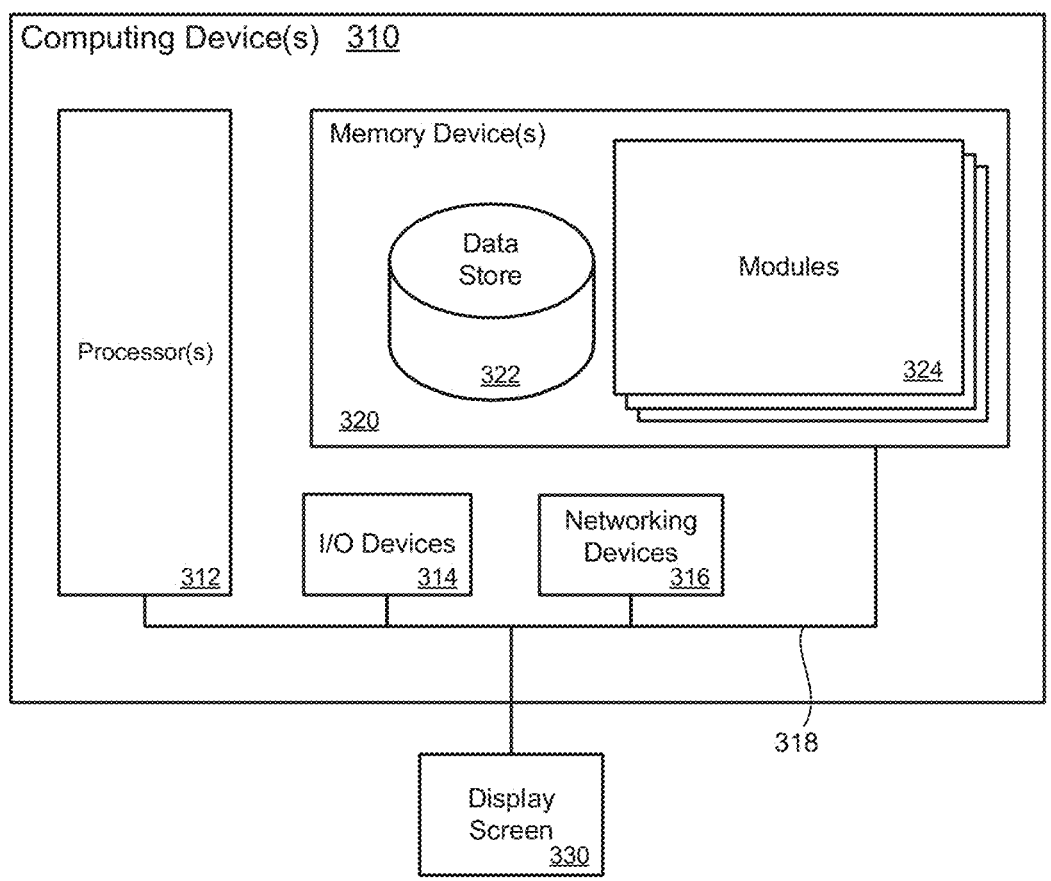
FIG. 3 is a block diagram illustrating an example of a computing device that may be used to execute a method for correcting thermal emissivity.

FIG. 3 illustrates a computing device 310 on which modules of this technology may execute. A computing device 310 is illustrated on which a high level example of the technology may be executed. The computing device 310 may include one or more processors 312 that are in communication with memory devices 320. The computing device 310 may include a local communication interface 318 for the components in the computing device. For example, the local communication interface 318 may be a local data bus and/or any related address or control busses as may be desired.

The memory device 320 may contain modules 324 that are executable by the processor(s) 312 and data for the modules 324. In one example, the memory device 320 can include an emissivity estimation module and other modules. The modules 324 may execute the functions described earlier. A data store 322 may also be located in the memory device 320 for storing data related to the modules 324 and other applications along with an operating system that is executable by the processor(s) 312. In one example, the data store 322 may include spectral emissivity data, satellite imaging data, thermal imaging data, and other data.

Other applications may also be stored in the memory device 320 and may be executable by the processor(s) 312. Components or modules discussed in this description that may be implemented in the form of software using high-level programming languages that are compiled, interpreted or executed using a hybrid of the methods.

The computing device may also have access to I/O (input/output) devices 314 that are usable by the computing devices. Networking devices 316 and similar communication devices may be included in the computing device. The networking devices 316 may be wired or wireless networking devices that connect to the internet, a LAN, WAN, or other computing network.

The components or modules that are shown as being stored in the memory device 320 may be executed by the processor(s) 312. The term "executable" may mean a program file that is in a form that may be executed by a processor 312. For example, a program in a higher level language may be compiled into machine code in a format that may be loaded into a random access portion of the memory device 320 and executed by the processor 312, or source code may be loaded by another executable program and interpreted to generate instructions in a random access portion of the memory to be executed by a processor. The executable program may be stored in any portion or component of the memory device 320. For example, the memory device 320 may be random access memory (RAM), read only-memory (ROM), flash memory, a solid state drive, memory card, a hard drive, optical disk, floppy disk, magnetic tape, or any other memory components.

The processor 312 may represent multiple processors and the memory device 320 may represent multiple memory units that operate in parallel to the processing circuits. This may provide parallel processing channels for the processes and data in the system. The local communication interface 318 may be used as a network to facilitate communication between any of the multiple processors and multiple memories. The local communication interface 318 may use additional systems designed for coordinating communication such as load balancing, bulk data transfer and similar systems, including output to a display screen 330.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, offs-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Example Experiments Using the Present Technology

FIG. 4 presents a laboratory test using an ICI 9640-P camera to derive the lens plus microbolometer sensor spectral response. Hyperspectral emissivity information for different agricultural and natural environment surface conditions in the 3 to 14 μm range was acquired from the MOMS UCSB Emissivity Library for assessment of narrowband emissivities for ICI and Landsat. Note that microbolometer sensors use the spectral range of about 7 to 14 μm to capture information. These measurements are affected by variations in atmospheric window (either end of this range) and ozone (~9-10 and will increase atmospheric correction. The convolved effect of the microbolometer spectral response and atmospheric window is more evident at increased elevations. Available microbolometers can typically have medium accuracy (i.e. often within 5° C., and most often within 3° C.), and a wide spectral response (i.e. about 7-14 μm), while particularly desirable microbolometer sensors can have higher accuracy (within 1° C., and 10-11 μm). Non-limiting examples of suitable microbolometer thermal cameras can include ICI, FUR (e.g. A6xx series), Apogee IR radiometers, MicaSense Altum, and the like.

Figure 5A:
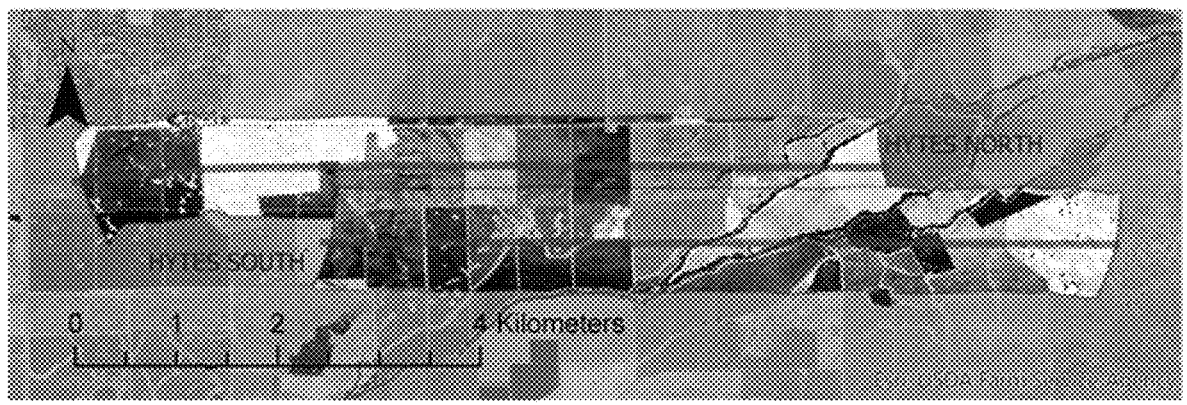
FIGS. 5A-B are images showing spatial emissivity information captured by the NASA JPL hyperspectral thermal emission spectrometer and spatial emissivity information captured by the NASA JPL hyperspectral thermal emission spectrometer.
Figure 5B:
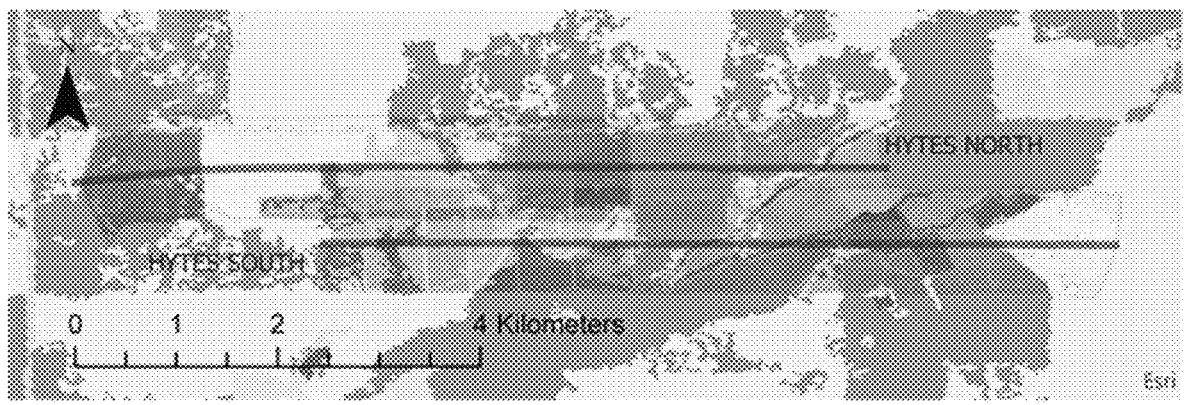

Spectral spatial information was retrieved from the NASA JPL Hyperspectral Thermal Emission Spectrometer-HYTES airborne Program for multiple commercial agricultural vineyards located in California. These vineyards are part of the Grape Remote sensing Atmospheric Profile & Evapotranspiration Experiment GRAPES. For the area of study, the spatial emissivity information covered different agricultural lands, (vineyards, alfalfa) and natural environments as presented in FIGS. 5A-B, where FIG. 5A shows 2014 NASA HYTES bands 150 (10.1 μm), 100 (9.2 μm), and 58 (8.5 μm) overpass over multiple vineyards and natural areas near Galt, California, two HYTES flights on the same date and time (NORTH and SOUTH, lines indicate flights), and FIG. 5B shows NASA HYTES bands 150 (10.1 μm), 100 (9.2 μm), and 58 (8.5 μm) overpass (lines indicate flights), along with 2011 National Land Cover Database (NLCD).

Landsat ETM+ Surface Reflectance Product is available from USGS44 for the same date as the HYTES airborne flights. In addition, UAV optical information was captured in the same growing season at a later date but in conjunction with Landsat 7 overpasses. Details on the thermal sensors characteristics are presented in Table 1 below. Details on dates and times for HYTES, Landsat, and UAV are presented in Table 2 below.

TABLE 1

| NASA JPL HYTES and ICI 9640-P Characteristics and Products | | |
|---|---|---|
| INSTRUMENT | Spectrometer | Thermal Camera |
| Brand/Model | ILP HYTES | ICI/9640-P |
| Weight (gr) | 12000 | 141 |
| Image Size (pixel) | 512 per track | 640 by 480 |
| Ground Resolution (m) | ~6 | ~0.6 |
| Sensor Type | pushbroom | snapshot |
| Spectral Range (μm) | 7.5-12 | 7-14 |
| Number of Bands | 256 | 1 |
| Spectral Band Centre (μm) | 9.75 | 10.35 |
| Operating Range | N/A | −40 to 140° C. |
| Reported Accuracy | N/A | +/−1.0° C. |
| Reported Emissivity | per band | 1.0 |
| NIST Traceable? | N/A | NOT REPORTED |
| Available product | Surface temperature Hyperspectral Emissivity | Blackbody Temperature |

TABLE 2

| Spatial Products and Capture Times | | | |
|---|---|---|---|
| Spatial Product | Spatial information | Ground Resolution (m) | Capture Date and Time (PST) |
| NASA JPL HYTES | Hyperspectral Emissivity | 6 | 2014-07-09 13:23 |
| Landsat ETM+ | Surface Corrected Reflectance | 30 | 2014-07-09 10:36 |
| AggieAir | High-Resolution Reflectance and Temperature | 0.15 Reflectance 0.60 Temperature | 2014-08-09 10:36 |

As shown in Table 2, a direct comparison of surface temperature between HYTES and NASA ETM+ may not be possible due to the time difference (~3 hours), nor is a comparison between AggieAir, HYTES, and Landsat possible due to different dates.

The estimation of spatial emissivity using HYTES information tailored to the ICI microbolometer spectral response was performed. The first step comprised the derivation of an HYTES emissivity product that responds to the ICI spectral response from Eq. 2 (shown above). The ICI emissivity was then linearly aggregated to Landsat spatial scale for reflectance-emissivity model estimation. On the UAV date, UM/reflectance information was "harmonized" (e.g., normalized) to Landsat reflectance characteristics to take advantage of the same data collection timing. Lastly, the reflectance-emissivity model was applied to harmonized. UAV reflectance for estimation of emissivity at UAV resolution (0.15 m).

Based on spectral emissivity curves available in the MODIS UCBS Emissivity Library, three major groups were considered for the analysis: water, vegetation, and soil. Not all vegetation nor soil types were available in MODIS UCBS, thus a representative set was analyzed. The emissivity spectral responses for these three major groups, along with Landsat and ICI spectral responses, are presented in FIG. 6A-6D, which shows emissivity comparison based on the MODIS UCBS Emissivity Library, Landsat, and ICI spectral response for water surfaces (6A), vegetation (6C), and soil (6B), and a comparison of derived emissivities for Landsat and ICI vs reported 8-14 um (6D). It was evident that emissivity values agree for water, agree less for vegetation but not for soil surfaces. In addition, computation of the Landsat and ICI emissivities using Equation 2 above, along with emissivity typically reported in the 8-14 um spectral range for the evaluated groups, are presented in Table 3 below.

TABLE 3

Figure 6A:
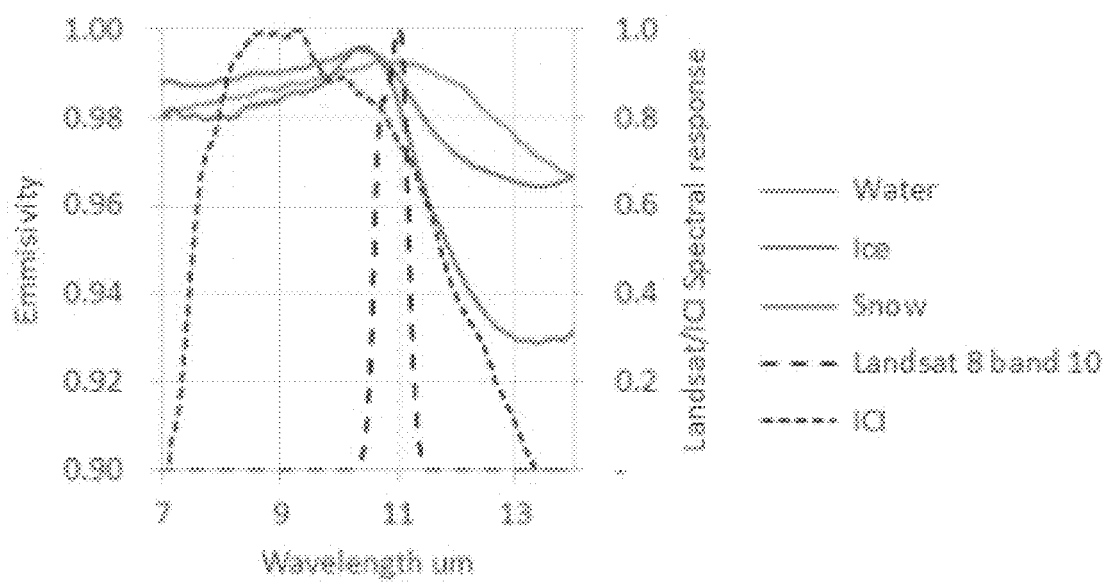
FIG. 6A-D includes graphs comparing derived emissivity of surfaces generated by different sensors.
Figure 6B:
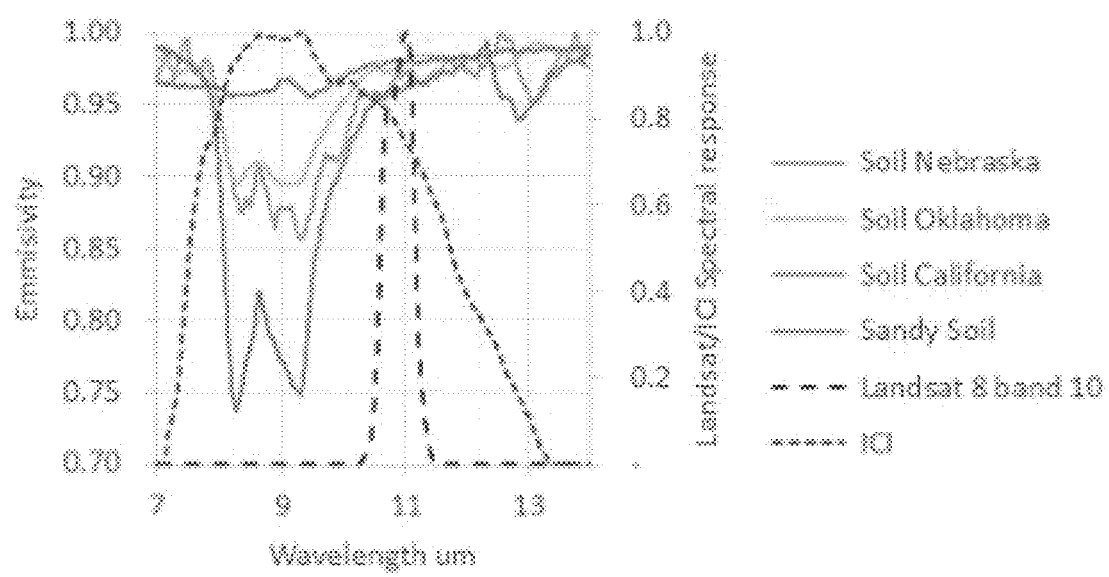
Figure 6C:
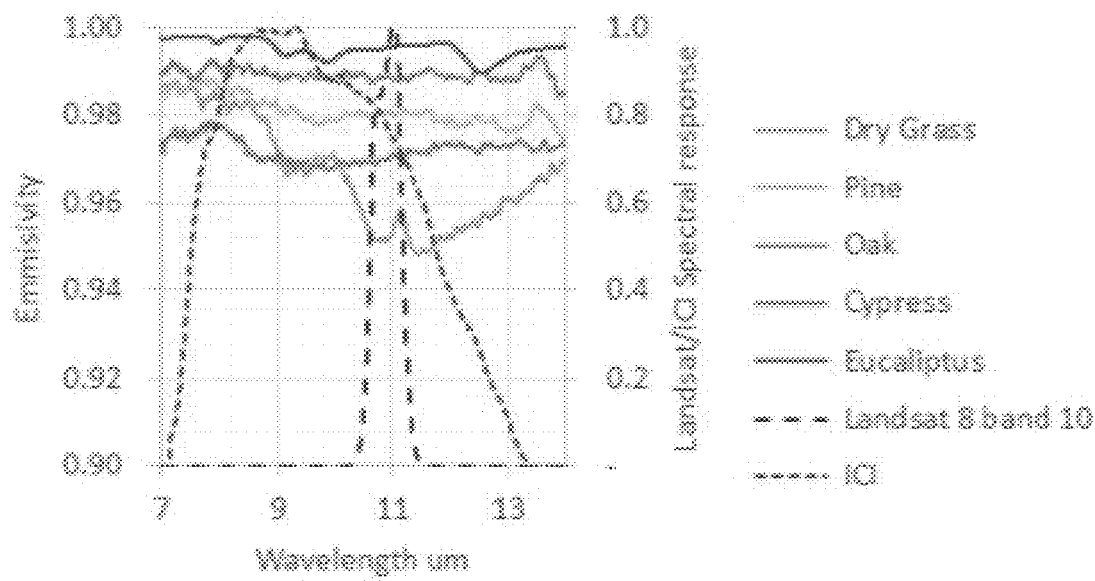
Figure 6D:
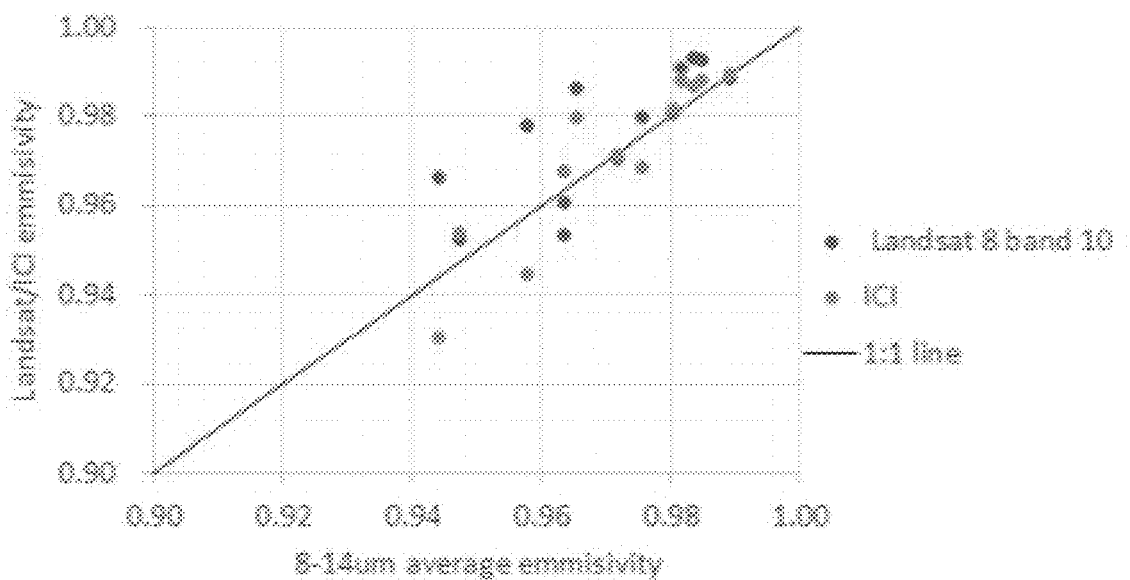

Summary of emissivity values presented in FIG. 6D for 8-14 um, Landsat, and ICI thermal sensors using MODIS UCBS Emissivity Library.

| Material | 8-14 um | Landsat | ICI |
|---|---|---|---|
| Water | 0.98 | 0.99 | 0.99 |
| Ice | 0.97 | 0.99 | 0.98 |
| Snow | 0.98 | 0.99 | 0.99 |
| Soil Nebraska | 0.94 | 0.97 | 0.93 |
| Soil Oklahoma | 0.96 | 0.98 | 0.94 |
| Soil California | 0.98 | 0.98 | 0.97 |
| Sandy Soil | 0.96 | 0.96 | 0.89 |
| Dry Grass | 0.96 | 0.95 | 0.97 |
| Pine | 0.98 | 0.98 | 0.98 |
| Oak | 0.97 | 0.97 | 0.97 |
| Cypress | 0.99 | 0.99 | 0.99 |
| Eucalyptus | 0.95 | 0.95 | 0.95 |

Figure 7A:
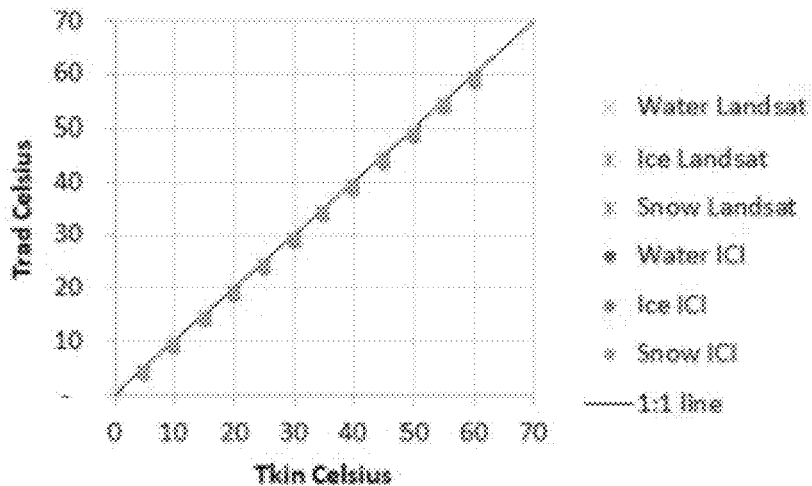
FIG. 7A-F includes additional graphs comparing derived emissivity of surfaces generated by different sensors.
Figure 7B:
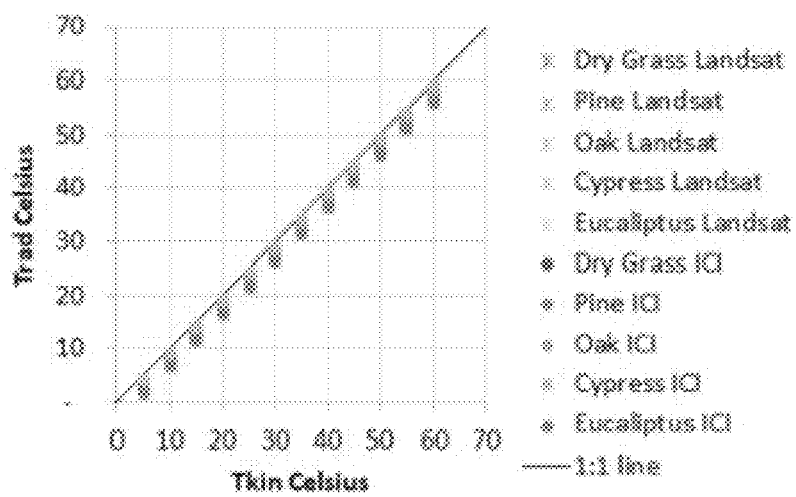
Figure 7C:
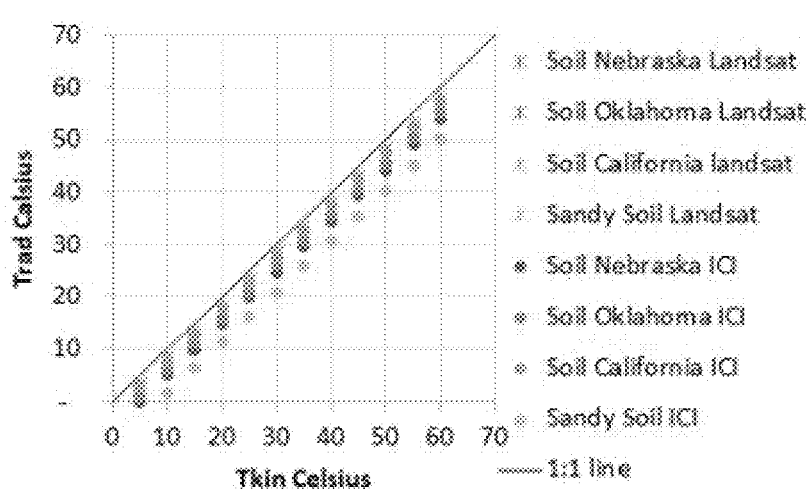
Figure 7D:
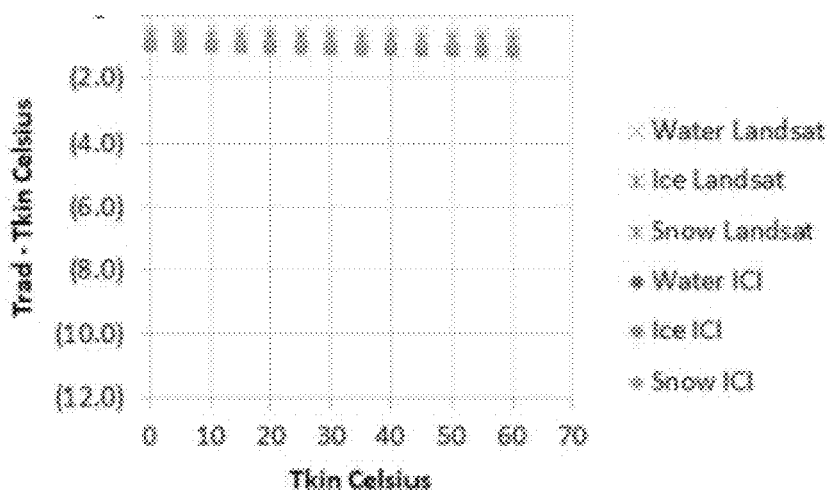
Figure 7E:
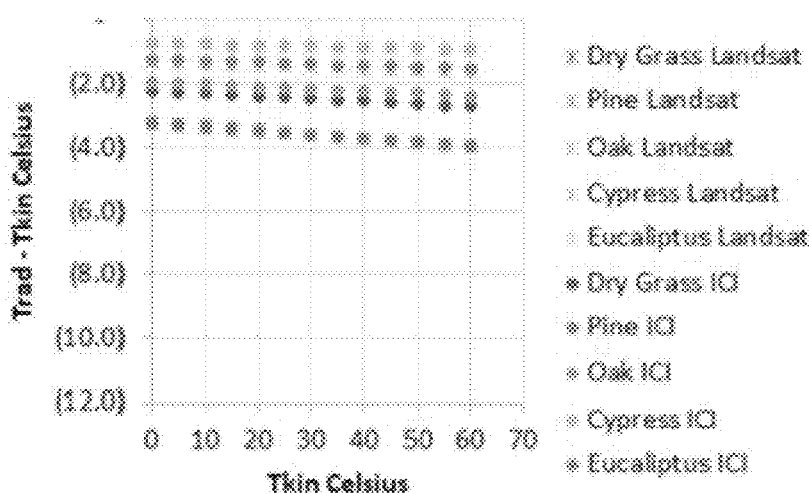
Figure 7F:
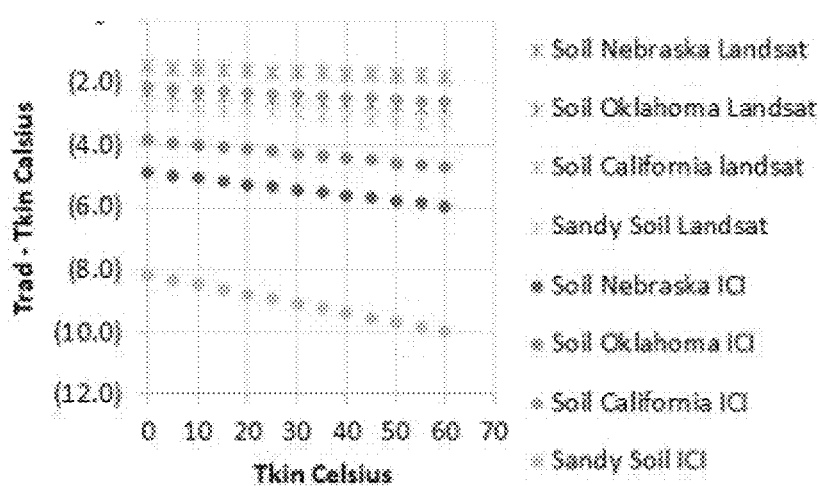
Figure 8A:
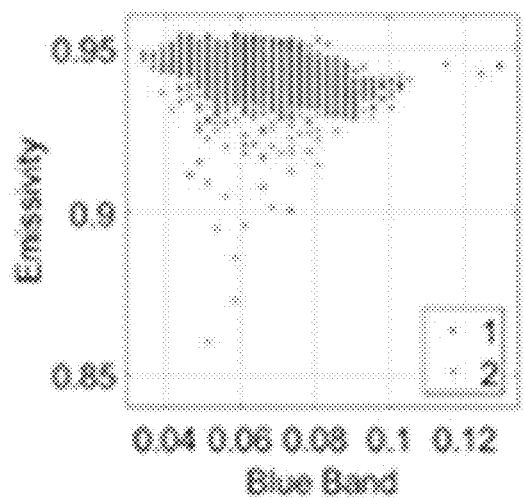
FIG. 8A-H includes graphs illustrating derived emissivity at Landsat scale vs spectral bands and band combination from Landsat at various spectral bands.
Figure 8B:
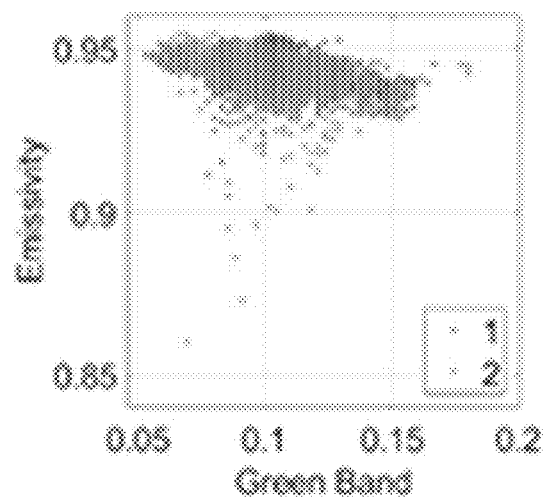
Figure 8C:
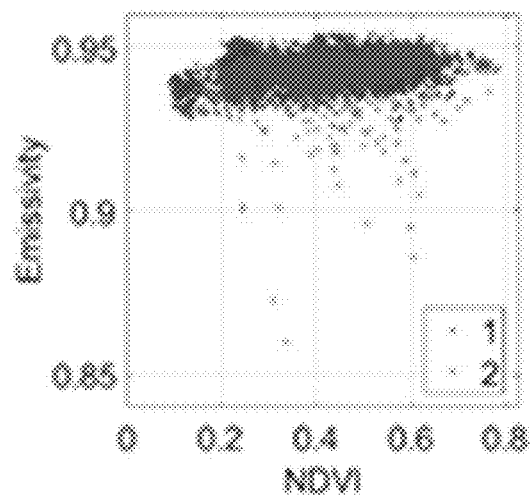
Figure 8D:
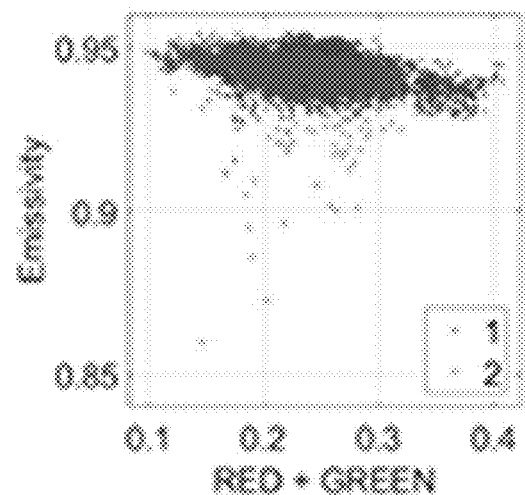
Figure 8E:
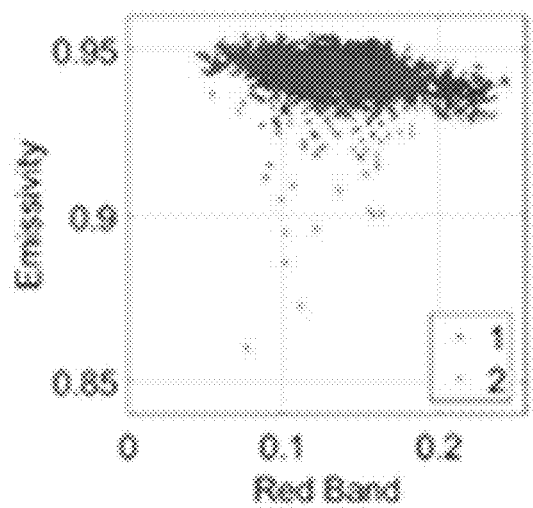
Figure 8F:
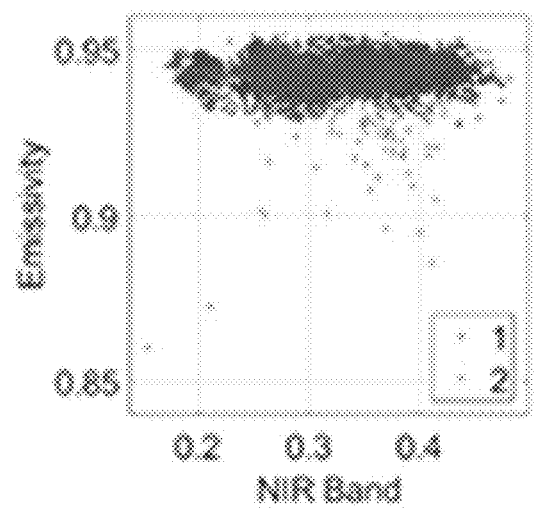
Figure 8G:
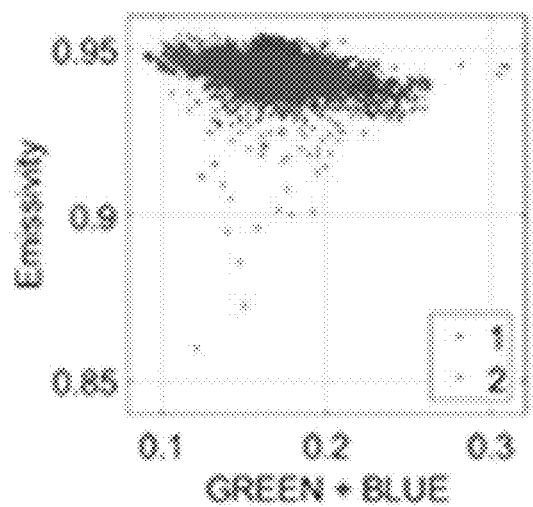
Figure 8H:
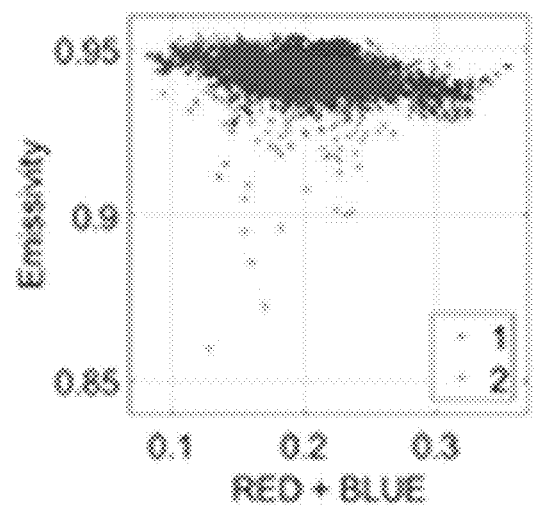

It was evident that the spectral response of the thermal sensor plays a role in the narrowband emissivity estimates as shown in FIG. 6D and Table 3. Typical 8-ruin averages for water surfaces agree with Landsat 8 and ICI sensors, as the differences between emissivity values are small. A similar affirmation can be made for vegetation. Nevertheless, for soil surfaces, the ICI sensor diverges from 8-14 um and Landsat emissivities, depending on the soil type present, but it is clear that emissivity for sandy soils will diverge more. This divergence in emissivity for soils and sandy surfaces has been documented previously, is due to strong quartz absorption. To further estimate the magnitude of the effects of emissivity for Landsat and ICI sensors, differences between kinetic and sensor temperature from 0 to 70 degrees Celsius for water, vegetation and soil were calculated and presented m FIG. 7A-F. HG. 7A-C shows kinetic and radiation temperatures comparison and differences (FIG. 7D-F) based on Landsat and ICI emissivities for water (7A and 7D), vegetation (7B and 7E) and soil (7C and 7F). Note the agreement of Landsat and ICI for water (<2 degrees Celsius), and for vegetation (<4 degrees Celsius). Soil surfaces present a significantly larger difference for ICI than for Landsat.

The results shown in FIG. 7A-F for kinematic and radiometric temperatures using Landsat or ICI indicates that the spectral response of the microbolometer camera affects the kinetic temperature estimates of soils to a greater magnitude than for vegetation or water. For Landsat, the expected maximum temperature difference across all evaluated surface groups is up to 4 degrees Celsius. For the ICI camera, the difference can be up to 10 degrees Celsius. This comparison indicates that care must be taken when mapping soil surfaces for energy balance methodologies due to the larger emissivity correction needed when using microbolometer cameras.

Figure 9A:
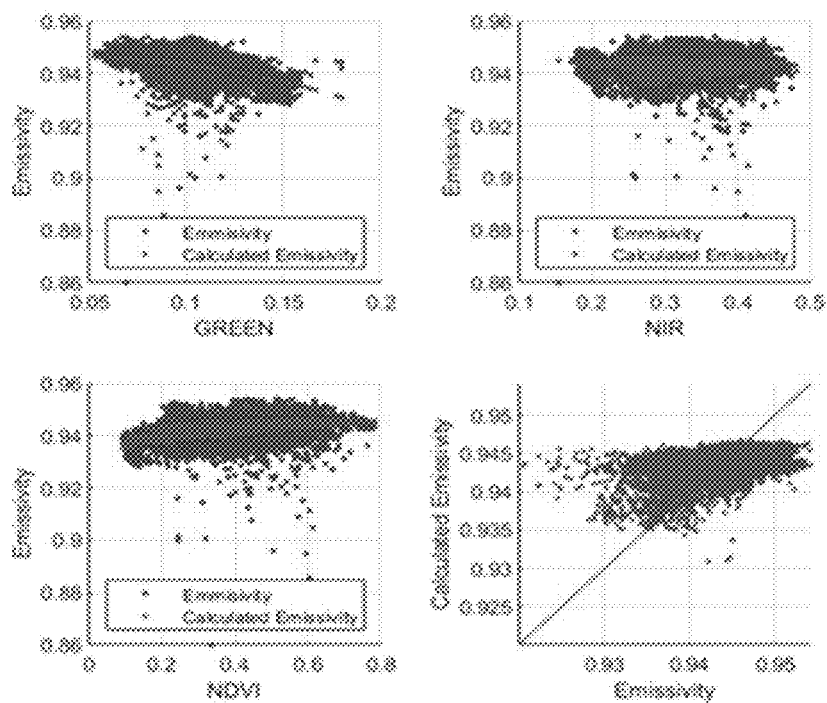
FIG. 9A includes graphics illustrating performance of a linear model for ICI emissivity estimation based on Landsat reflectance products.

As described earlier, a HYTES emissivity product that responds to the ICI spectral response derived for the two HYTES flights (North and South) was scaled to Landsat resolution and is presented in FIG. 8A-H showing HYTES ICI derived emissivity at Landsat scale vs spectral bands and band combination from Landsat. SWIR bands are not considered due to lack of an equivalent in UAV sensors. Blue and Red scatter color (named 1 and 2) are the HYTES North and South, respectively. It is evident from the comparison of Landsat optical spectral bands and combinations and HYTES ICI emissivity values in FIG. 8A-H, that the correlation is limited or weak. In every presented scatterplot, a linear trend is clear, but with a considerable variance along the trend, indicating significant limitations for linear modeling of emissivity. Nonetheless, an initial approach that considers a linear combination of spectral bands from Landsat is presented below (Table 4 and FIG. 9A showing performance of a linear model for ICI emissivity estimation based on Landsat reflectance products).

TABLE 4

Performance of a Linear model for ICI emissivity estimation based on Landsat bands

| Model | Inputs | Coefficients | Fit Statistics |
|---|---|---|---|
| $y = a + b*x1^{\wedge}2 + c*x2^{\wedge}2 + d*x3^{\wedge}2 + e*x1$ | x1: GREEN<br>x2: NIR<br>x3: NDVI | a: 0.943<br>b: −0.615<br>c: −0.056<br>d: −0.005<br>e: 0.042 | Obs: 9600<br>RMSE: 0.004 |

Table 4 and FIG. 9A show that a linear model based on reflectance and vegetation indices has a limited prediction capability due to the weak linear relationship between Landsat spectral bands and the HYTES ICI emissivity.

Figure 9B:
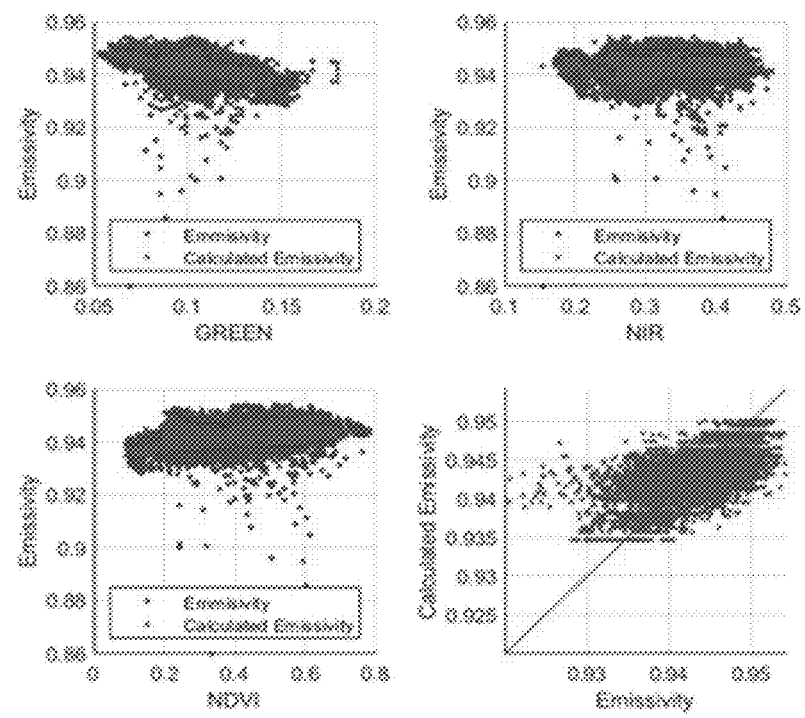
FIG. 9B includes graphics illustrating performance of a regression decision tree model for ICI emissivity estimation based on Landsat optical bands.

A second approach, based on machine learning (Regression Decision Tree) and implemented in MATLAB (function fitrtree) was implemented as shown in Table 5 and FIG. 9B which shows performance of a regression decision tree model fix ICI emissivity estimation based on Landsat optical bands.

TABLE 5

Performance of a Regression model for ICI emissivity estimation based on Landsat bands

| Model | Inputs | Calibration scheme | Fit Statistics |
|---|---|---|---|
| Regression Decision Tree | BLUE<br>GREEN<br>RED<br>NIR | 70% Training<br>30% Testing | Obs: 9600<br>RMSE: 0.004 |

Figure 10A:
FIGS. 10A and 10B includes aerial images showing UAV RGB imagery and estimation of high-resolution ICI emissivity using HYTES-Landsat regression decision tree and microbolometer spectral response.
Figure 10B:
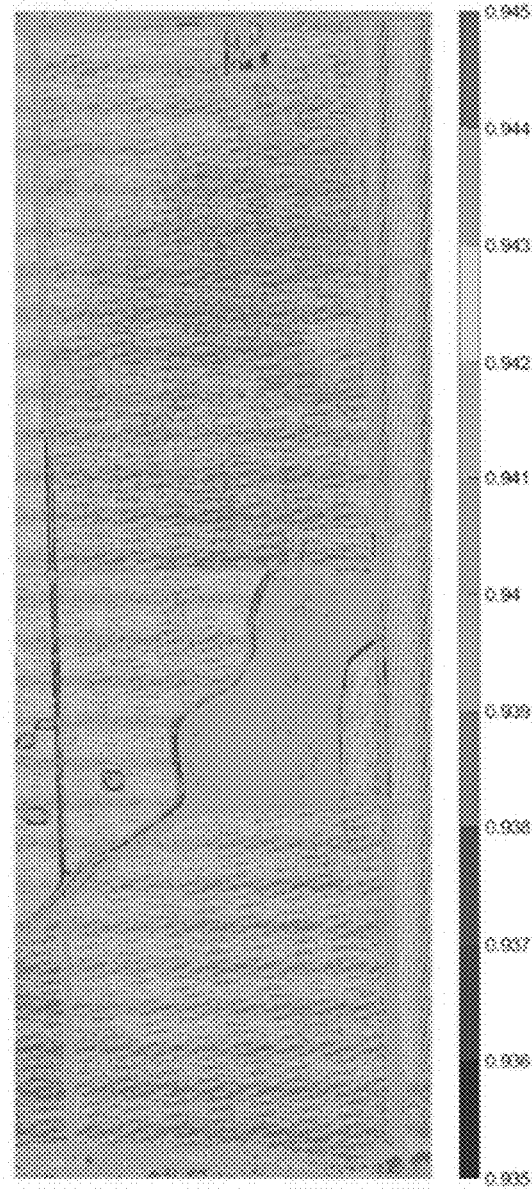
Figure 10C:
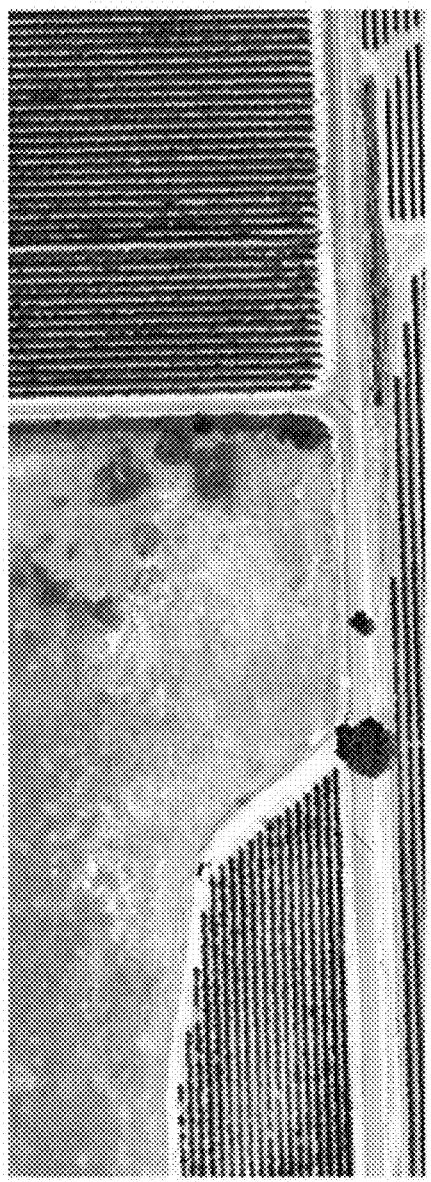
FIGS. 10C and 10D includes images showing a close up view of aerial RGB image and derived ICI emissivity map, respectively.
Figure 10D:
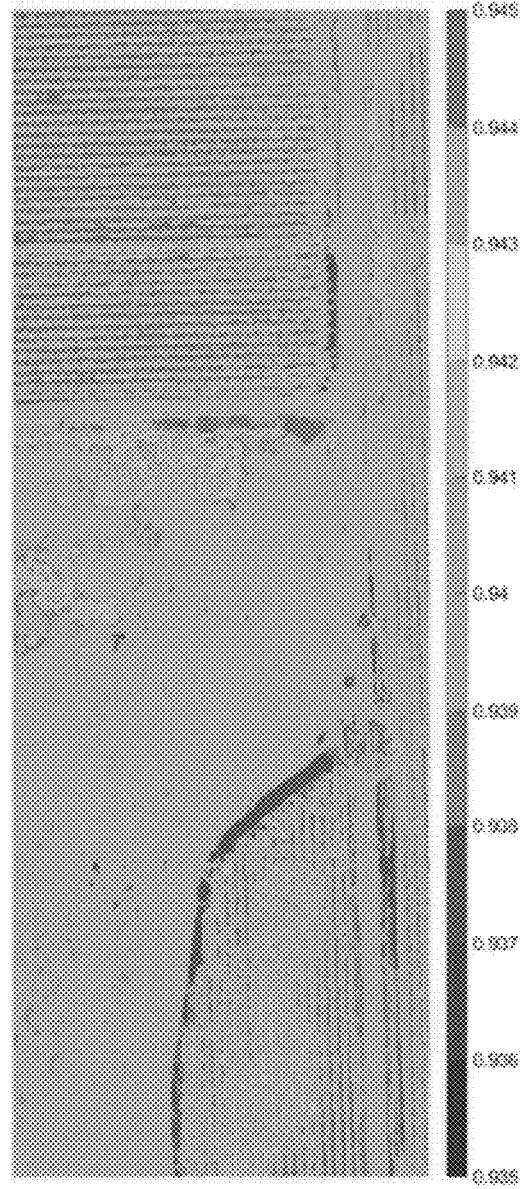

The implemented Regression Decision Tree model provided a more adequate ICI derived emissivity estimation than the linear model. Nevertheless, the 1:1 comparison provided in FIG. 9B, indicates that the model can benefit from additional efforts in input variables and additional MITES and Landsat datasets. FIGS. 10A-D show the derivation of ICI emissivity at 0.15 m/pixel using the Landsat/UAV harmonized reflectance products. More specifically, FIG. 10A an aerial image showing UAV RGB imagery, while FIG. 10B shows an estimation of high-resolution ICI emissivity using HYTES-Landsat Regression Decision Tree and AggieAir reflectance for the same region. Emissivity values range from 0.935 to 0.945. The model provides a clear differentiation between bare soil (soil and service roads) and vegetation (vineyards and forest). FIGS. 10C and 10D are close up views of a portion of FIGS. 10A and 10B, respectively.

The use of the regression decision tree does not limit the use of other statistical or datamining techniques. For example, as described below, deep learning algorithms (e.g. Deep Neural Networks) can be used to develop the emissivity-optical imagery due to their additional parameter internal correlation development (neuron to neuron relationship).

A deep-learning emissivity model was calibrated using the same Landsat information as the Random Forest described above to estimate narrowband emissivity values. The deep-learning model included an input layer, hidden layers, and an output layer. The input layer included the Landsat bands, band ratios, and index values (i.e., four bands, six band ratios, and six normalized difference indexes). The output layer included emissivity values. The hidden layers included a specific number of nodes that transform the input data and enable statistical interactions using activation functions (i.e., the Rectified Linear Unit function) between the inputs and outputs. A regularization method based on Lasso Regression was applied to avoid overfitting. The number of hidden layers, number of nodes per layer, number of epochs, and batch size had to be selected to find the appropriate deep-learning model. The batch size was the number of training samples processed before the deep-learning parameters were updated. Preliminary results showed that the optimal number of batch size was 100. The data sample consisted of 4932 observations. 70% of the data samples were used for training the model, and 30% were used for testing the model. Several deep-learning models were built to include different parameter settings (the number of hidden layers (ranging from 1 to 4), the number of nodes per layer (ranging from 50 to 200 with increments of 50), and the number of epochs (1000 and 2000)). The goodness of statistics used for the selection of the model was the root mean square error (RMSE). The selected model is the one with the minimum RMSE corresponding to the testing phase, shown in Table 6 below.

TABLE 6 deep-learning model performance for narrowband emissivity estimation based on Red, Green, Blue and NIR bands.

| DL Parameter Values | Inputs | Calibration scheme | Fit Statistics |
|---|---|---|---|
| Hidden Layers: 3 | 4 Bands: Blue, Green, Red, NIR | 70% Training | Obs: 4932 |
| Nodes: 200 | 6 Ratios: Blue/Green, Blue/Red, Blue/NIR Green/Red, Green/NIR, Red/NIR | 30% Testing | RMSE Train: 0.003 RMSE Test: 0.004 |
| Epochs: 1000 | | | |
| Batch size: 100 | 6 Normalized Difference (ND) Indexes: ND_Green&Blue, ND_Red_Blue, ND_NIR&Blue ND_Red&Green, ND_NIR&Green, ND_NIR&Red | | |

The narrowband emissivity from the deep-learning model and a previously trained random forest were numerically and visually assessed. The emissivity result with the best goodness of fit statistics was then incorporated into the radiometric temperature.

An additional analysis was performed based on the hyperspectral emissivity UCSB dataset (from 3 to 14 μm) to approximate the broadband emissivity estimates at the UAV pixel scale, using the narrowband emissivity estimation. The broadband emissivity can be used to estimate the outgoing longwave radiation, as part of the net radiation, once the surface (kinematic) temperature is available. Given the closeness of the spectral range of the narrowband to the broadband emissivities, the narrowband to broadband model was developed first by estimating the narrowband emissivity by the ratio of the convolved sum-product. UCSB emissivity, microbolometer spectral response and the Planck equation at a temperature of 300K, and the convolved sum-product of the microbolometer spectral response and the Planck equation. The broadband emissivity was calculated as the sum-product of hyperspectral emissivity and the Planck equation divided by the sum of the Planck equation for the 3 to 14 μm42.

Figure 11:
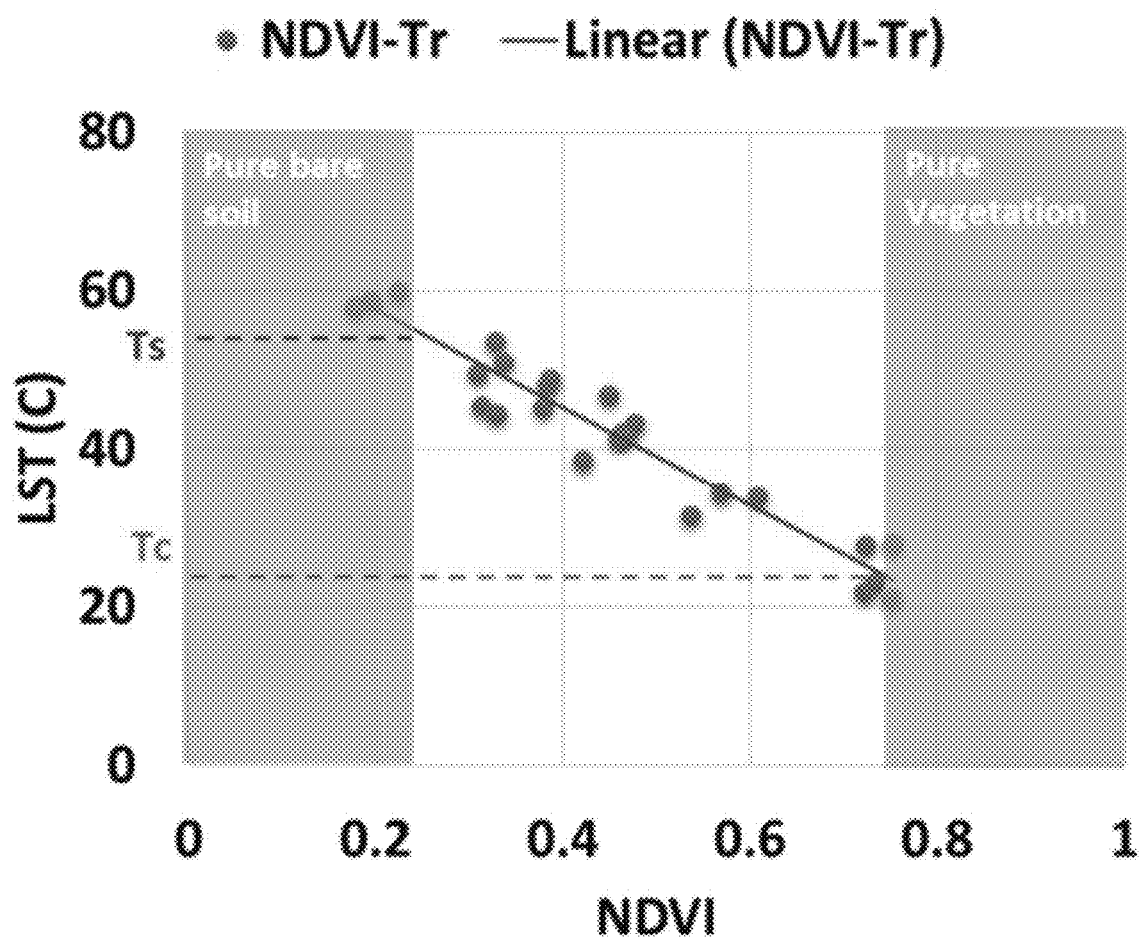
FIG. 11 is a graph showing results for a dual temperature approach for temperature estimation.

To test the impact of sensor-specific and broadband emissivity in this study, the Two-Source Energy Balance (TSEB) model with the canopy and soil (also called Dual) temperature estimation was used. The dual temperature approach is shown in FIG. 11, where Canopy (Tc) and Soil (Ts) Temperature estimation over spatial domain grid is based on a linear relationship between NDVI and Land Surface Temperature (LST). In FIG. 11, the estimation/separation of the canopy and soil temperature within a spatial domain grid is achieved by the linear behavior of NDVI (or any other vegetation index) with temperature and defining soil or canopy average temperature conditions by thresholds that identify these two vegetation conditions. For example, bare soil threshold is NEVI below or equal to 0.3, and fully developed vegetation threshold is NDVI equal to or higher than 0.75).

The TSEB model can use radiometric or kinematic temperature to infer (radiometric or kinematic, respectively) canopy and soil temperature, which in turn are used to estimate energy balance components for each of them. Typically, the radiometric temperature is used due to the lack of spatially estimated emissivity. Assuming no atmospheric correction is needed, the estimation of kinematic temperature from radiometric temperature is $Ts=(1/\varepsilon)^{0.25}Tr$ where Ts is the kinematic temperature, $\varepsilon$ is the narrowband emissivity, and Tr is the radiometric temperature, as provided by the infrared thermal sensor.

Internally, the TSEB model does not assign a narrowband emissivity to vegetation and soil conditions. Also, internally, the TSEB model estimates the net radiation components, which requires solving the absorption and reflection of short-wave radiation, as well as the outgoing and incoming long-wave radiations, expressed as $Rn=(1-\alpha)Rs-L\uparrow+L\downarrow$ where Rn is the net radiation (W m-2), Rs is the solar radiation (W m-2), $\alpha$ is the soil surface albedo ($\alpha=0-1$), $L\uparrow$ is the outgoing long-wave radiation (W m-2) from the Earth's surface, and $L\downarrow$ is the long-wave incoming radiation (W m-2) from the sky.

The long-wave radiation uses the broadband emissivity and the kinematic temperature $L\uparrow=\varepsilon b(\sigma Ts^4)$ where $\varepsilon b$ is the broadband emissivity, $\sigma$ is the Stefan-Boltzmann coefficient, and Ts is the kinematic temperature. A traditional broadband emissivity value of 0.98 for vegetation and 0.95 for soil is assigned as implemented within the TSEB model.

Figure 12:
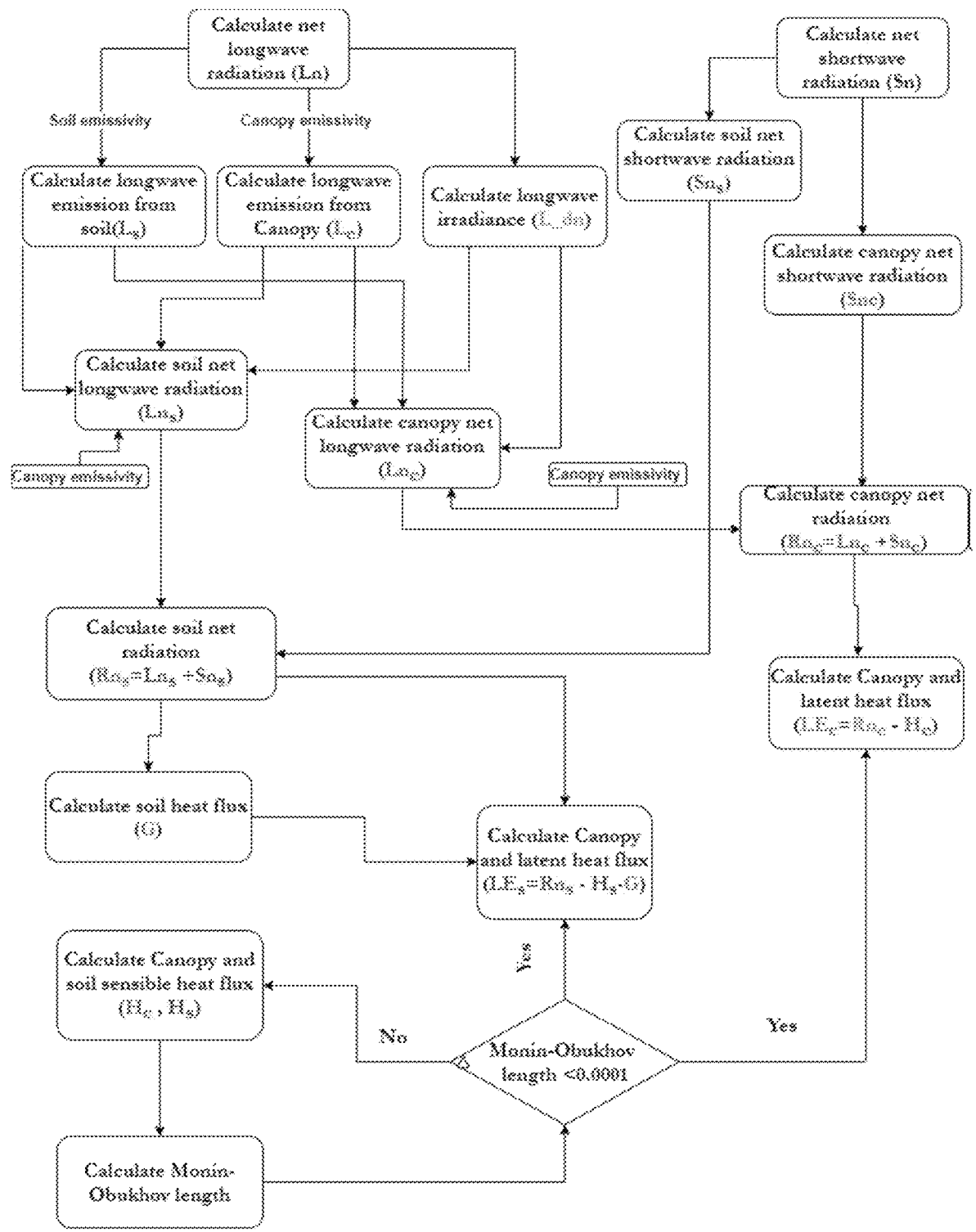
FIG. 12 is a flow diagram illustrating an example method for two-source energy balance (TSEB) dual temperature data processing.

The incoming long-wave radiation values are obtained from eddy covariance (EC) instrumentation for clear skies, or it can be calculated as $L\downarrow=\varepsilon a(\sigma Ta^4)$ where $\varepsilon a$ is the air emissivity, and Ta is the air temperature at 2 m elevation from the ground. FIG. 12 describes in detail the TSEB model process as well as the use of radiometric temperature and incoming and outgoing longwave radiation to solve the surface energy balance model. As result of the TSEB model run, the instantaneous estimates of the four energy balance components were produced. These components are Rn: Net Radiation, G: Ground Heat Flux, H: Sensible Heat Flux, and LE: Latent Heat Flux, the last of which is the equivalent of evapotranspiration, in energy units (W/m2).

Figure 13A:
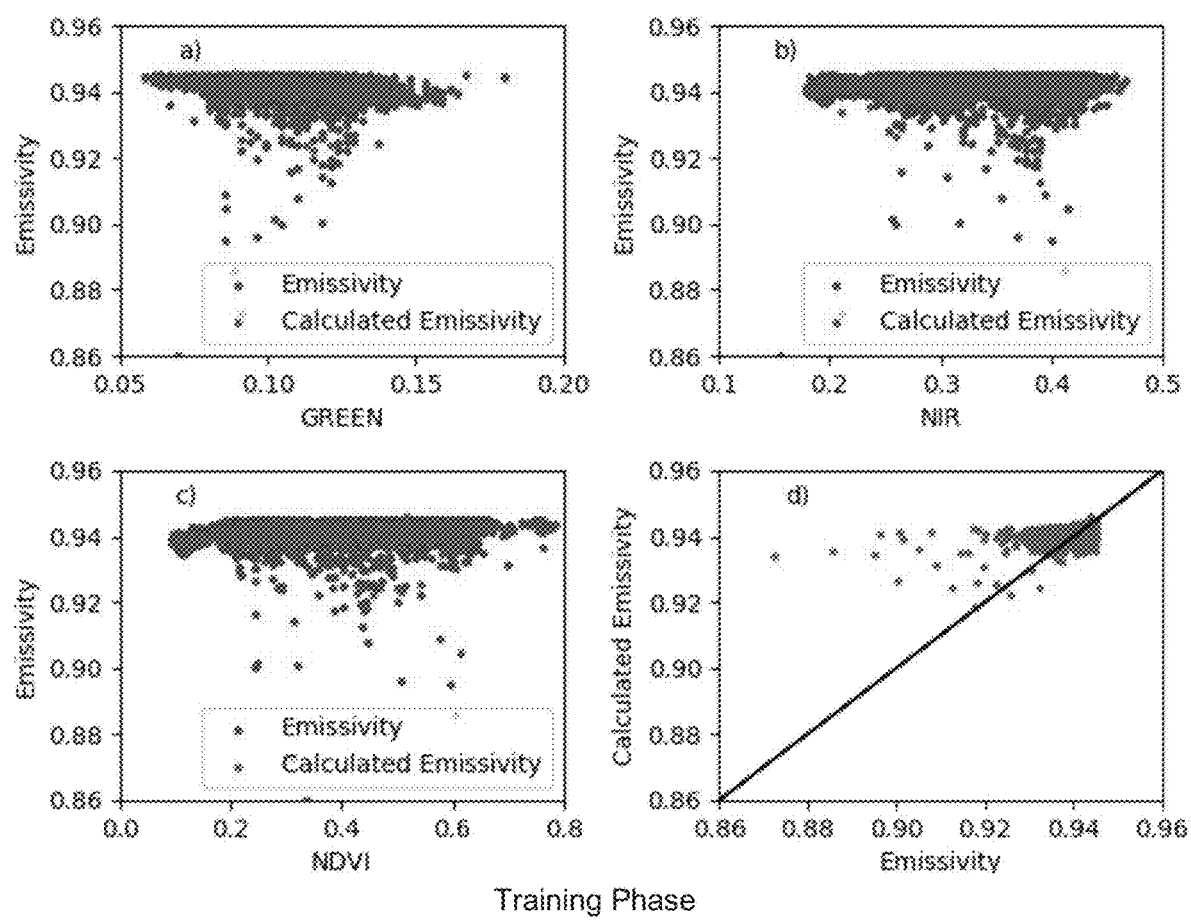
FIG. 13A-B includes graphs illustrating performance of a deep-learning narrowband emissivity model.
Figure 13B:
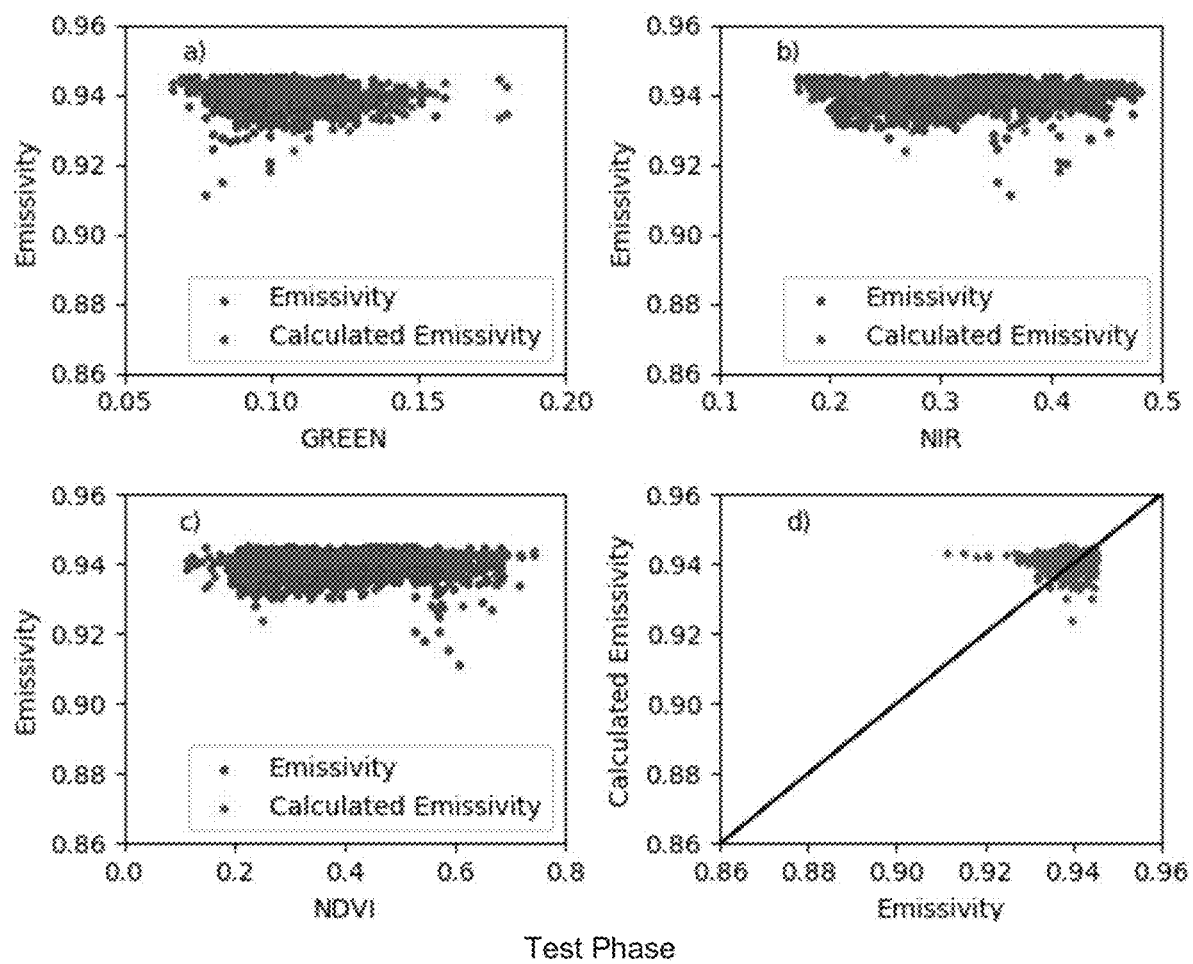

FIG. 13A-B shows the overall performance of the deep-learning model for the estimation of narrowband emissivity using Landsat reflectance and NASA HyTES information. The scatter plot pattern indicates that, while the deep-learning model results approximate the emissivity values, there are still conditions where the estimated emissivity does not relate to HYTES-derived emissivity. This limited relationship might be due to a potential issue where two or more inputs of the model are linearly related (multicollinearity) or the reduced relationship between used inputs and emissivity. A visual comparison at UAV resolution (0.15 m/pixel) between the deep-learning and random forest models is presented in FIGS. 14A-B, where FIG. 14A shows visual image of a region, while FIG. 14B shows narrowband emissivity results from random forest model and FIG. 14C shows results from a deep-learning model. FIGS. 14D-14F shows close up views of the visual image of FIG. 14A, and narrowband emissivity results from random forest (FIG. 14B) and deep-learning (FIG. 14C) models.

Figure 15:
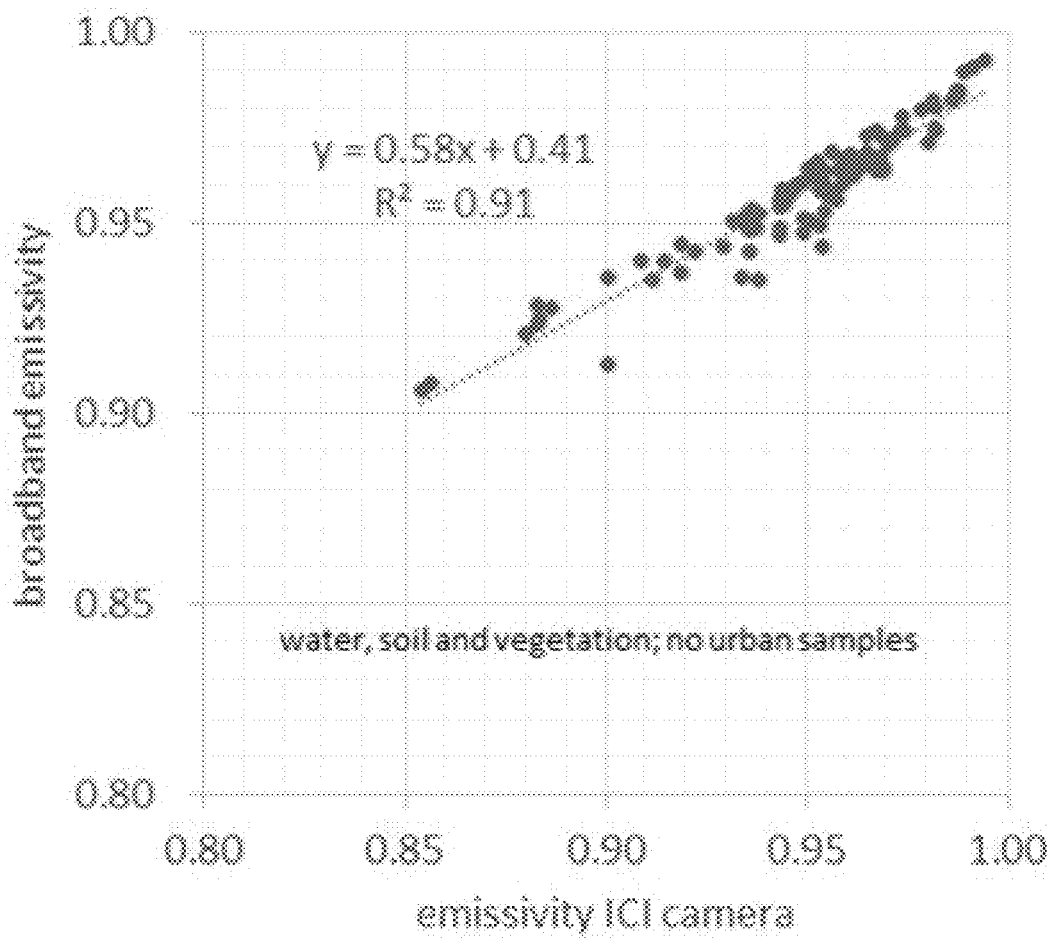
FIG. 15 is a graph showing a narrowband and broadband emissivity relationship and resulting linear equation.

To estimate the broadband emissivity, water, soil, and vegetation emissivity samples from the UCSB emissivity archive were processed as described in earlier, along with a narrowband emissivity estimation for the ICI microbolometer UAV camera. The narrowband and broadband emissivity relationship and resulting linear equation are presented in FIG. 15, which show broadband vs, ICI camera (narrowband) emissivity relationship based on the UCSB water, soil, and vegetation emissivity archive. The found relationship of broadband to narrowband emissivity approximates a linear relationship, due to the broad spectral response of the ICI camera (7 to 14 µm). It is expected that other microbolometer sensors and infrared radiometers have a similar relationship due to their similar broad spectral response.

Accordingly, the deep-learning model provided an improvement or the random forest model, especially in locations with confounding factors (water, soil, healthy vegetation). Additional data sets and locations can improve these initial results from this deep-learning implementation. In terms of improvements to the estimation of surface energy balance and evapotranspiration, the TSEB model was shown to be insensitive to the changes in temperature and radiation that the schemes and scenarios provided and saw a small improvement in energy flux estimation by the inclusion of emissivity, thus its use is recommended whenever this information is available. Nevertheless, the documented insensitivity of the TSEB model to changes in temperature and radiation allows for its use with other UAV optical and thermal sensors, as currently available in the UAV sensor market.

What is claimed is:

1. A method for spatially estimating thermal emissivity, comprising:
obtaining spectral emissivity data for a geographic area generated using an airborne imaging spectrometer;
obtaining satellite imaging data for the geographic area;
generating a weighted emissivity model of emissivity values for surfaces included in the geographic area from the spectral emissivity data and the satellite imaging data, wherein the spectral emissivity data is mapped to the satellite imaging data to generate the weighted emissivity model;
obtaining thermal imaging data for the geographic area, wherein the thermal imaging data is generated by an airborne thermal imaging sensor; and
generating a thermal emissivity map for the geographic area using the thermal imaging data and the weighted emissivity model, wherein the emissivity values from the weighted emissivity model are used to estimate emissivity values in the thermal imaging data as accurate kinematic thermal values in the thermal emissivity map, wherein generating the weighted emissivity model further comprises calculating a narrowband emissivity for each of the surfaces based on a spectral response of the thermal imaging sensor, where the narrowband emissivity is given as $$\varepsilon = \int_{\lambda_1}^{\lambda_2} \varepsilon_\lambda \cdot f_\lambda d\lambda$$

wherein $\varepsilon_\lambda$ is an emissivity value for a wavelength $\lambda$, and $f_\lambda$ is the spectral response of the thermal imaging sensor for a defined waveband, and an integral of $f_\lambda$ is equal to unity, and $\lambda_1$ and $\lambda_2$ are limits of the spectral response of the sensor.

2. The method as in claim 1, wherein generating the weighted emissivity model further comprises converting the spectral emissivity data to weighted emissivity values that correspond to a spectral response of the thermal imaging sensor.

3. The method as in claim 1, wherein the spectral emissivity data includes spectral-spatial information which is used to map the spectral emissivity data to a spatial scale of the satellite imaging data.

4. The method as in claim 3, further comprising linearly aggregating the spectral emissivity data to the spatial scale of the satellite imaging data.

5. The method as in claim 3, wherein generating the thermal emissivity map further comprises using machine learning to estimate narrowband emissivity values.

6. The method as in claim 1, wherein generating the thermal emissivity map further comprises normalizing the thermal imaging data to correspond to the satellite imaging data.

7. The method as in claim 1, wherein the airborne imaging spectrometer is a hyperspectral thermal emission spectrometer.

8. The method as in claim 1, wherein the thermal imaging sensor is a microbolometer sensor.

9. The method as in claim 1, wherein generating the thermal emissivity map further comprises:
mapping surface reflectance information included in the satellite imaging data to reflectance information included in the thermal imaging data;
comparing the surface reflectance information for the satellite imaging data to the reflectance information for the thermal imaging data; and
correcting the surface reflectance information that biases the satellite imaging data.

10. The method as in claim 1, wherein a time stamp of the spectral emissivity data and the satellite imaging data is within a time period in which the thermal imaging data was captured.

11. A system for determining accurate kinematic temperature, comprising:
an airborne thermal imaging sensor;
at least one processor; and
a memory device including instructions that, when executed by the at least one processor, cause the system to:
receive thermal imaging data generated by the airborne thermal imaging sensor, wherein the thermal imaging data covers a defined geographic area;

obtain a weighted emissivity model of emissivity values for surfaces which corresponds to the defined geographic area; and generate a thermal emissivity map for the geographic area using the thermal imaging data and the weighted emissivity model, wherein the emissivity values from the weighted emissivity model are used to estimate emissivity values in the thermal imaging data to produce accurate kinematic thermal values in the thermal emissivity map, wherein the weighted emissivity model further comprises calculating a narrowband emissivity for each of the surfaces based on a spectral response of the thermal imaging sensor, where the narrowband emissivity is given as $$\varepsilon = \int_{\lambda_1}^{\lambda_2} \varepsilon_\lambda \cdot f_\lambda d\lambda$$

wherein $\varepsilon_\lambda$ is an emissivity value for a wavelength $\lambda$, and $f_\lambda$ is the spectral response of the thermal imaging sensor for a defined waveband, and an integral off is equal to unity, and $\lambda_1$ and $\lambda_2$ are limits of the spectral response of the sensor.

12. The system in claim 11, wherein the memory device further includes instructions that, when executed by the at least one processor, cause the system to:

obtain spectral emissivity data that includes spectral-spatial information for the defined geographic area, wherein the spectral emissivity data is generated using an airborne imaging spectrometer;

obtain satellite imaging data for the defined geographic area; and generate the weighted emissivity model from the spectral emissivity data and the satellite imaging data, wherein the spectral-spatial information is mapped to a spatial scale of the satellite imaging data to generate the weighted emissivity model.

13. The system in claim 12, wherein generating the weighted emissivity model includes converting the spectral emissivity data to weighted emissivity values that correspond to a spectral response of the airborne thermal imaging sensor.

14. The system in claim 11, wherein the memory device further includes instructions that, when executed by the at least one processor, cause the system to obtain satellite imaging data for the defined geographic area from a publicly available data store.

15. The system in claim 11, wherein the airborne thermal imaging sensor is a microbolometer coupled to an unmanned aerial vehicle (UAV).

16. The system in claim 15, wherein the memory device further includes instructions that, when executed by the at least one processor, cause the system to transmit the thermal emissivity-map from the UAV to a ground based server computer.

17. The system in claim 16, wherein the thermal emissivity map is transmitted over a cellular network.

18. The system in claim 15, wherein the memory device further includes instructions that, when executed by the at least one processor, cause the system to store the thermal emissivity map to the memory device on the UAV to allow the thermal emissivity map to be transferred from the memory device when a network connection is available.

19. A non-transitory machine-readable storage medium including instructions embodied thereon, wherein the instructions, when executed by at least one processor:

obtain spectral imaging data for a geographic area generated using an airborne imaging spectrometer;

obtain satellite imaging data for the geographic area;

generate a weighted emissivity model of emissivity values for surfaces included in the geographic area from the spectral imaging data and the satellite imaging data, wherein the spectral imaging data is converted to the emissivity' values which correspond to a spectral response of a thermal imaging sensor, and the emissivity values are mapped to a spatial scale of the satellite imaging data;

receive thermal imaging data for the geographic area from an airborne thermal imaging sensor; and generate a thermal emissivity map for the geographic area using the thermal imaging data and the weighted emissivity model, wherein the thermal imaging data is mapped to the spatial scale of the satellite imaging data, and wherein the emissivity values from the weighted emissivity model are used to generate accurate kinematic thermal values in the thermal emissivity map, wherein generating the weighted emissivity model further comprises calculating a narrowband emissivity for each of the surfaces based on a spectral response of the thermal imaging sensor, where the narrowband emissivity is given as $$\varepsilon = \int_{\lambda_1}^{\lambda_2} \varepsilon_\lambda \cdot f_\lambda d\lambda$$

wherein $\varepsilon_\lambda$ is an emissivity value for a wavelength $\lambda$, and $f_\lambda$ is the spectral response of the thermal imaging sensor for a defined waveband, and an integral of $f_\lambda$ is equal to unity, and $\lambda_1$ and $\lambda_2$ are limits of the spectral response of the sensor.

* * * * *